(12) United States Patent
Chen et al.

(10) Patent No.: US 9,087,472 B2
(45) Date of Patent: Jul. 21, 2015

(54) ARRAY SUBSTRATE OF A DISPLAY PANEL AND THE DRIVING METHOD THEREOF

(71) Applicant: AU Optronics Corporation, Hsin-Chu (TW)

(72) Inventors: Yi-Ching Chen, Hsin-Chu (TW);
Yu-Sheng Huang, Hsin-Chu (TW);
Chia-Wei Chen, Hsin-Chu (TW);
Chun-Ru Huang, Hsin-Chu (TW);
Cheng Wang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 239 days.

(21) Appl. No.: 13/874,540

(22) Filed: May 1, 2013

(65) Prior Publication Data
US 2014/0152640 A1    Jun. 5, 2014

(30) Foreign Application Priority Data

Nov. 30, 2012  (TW) .............................. 101145086 A

(51) Int. Cl.
| | | |
|---|---|---|
| *G09G 3/00* | (2006.01) | |
| *G09G 3/36* | (2006.01) | |
| *G02F 1/1362* | (2006.01) | |
| *G02F 1/1343* | (2006.01) | |

(52) U.S. Cl.
CPC .............. *G09G 3/003* (2013.01); *G09G 3/3607* (2013.01); *G09G 3/3648* (2013.01); *G02F 1/13624* (2013.01); *G02F 2001/134345* (2013.01); *G09G 3/3659* (2013.01); *G09G 2300/0443* (2013.01); *G09G 2320/028* (2013.01); *G09G 2320/0209* (2013.01)

(58) Field of Classification Search
CPC ........ G02F 2001/134345; G02F 2001/134354; G02F 2001/13624; G02F 2001/136245; G09G 3/003; G09G 3/3648; G09G 2300/0443; G09G 2300/0426
See application file for complete search history.

(56) References Cited

U.S. PATENT DOCUMENTS

| | | | |
|---|---|---|---|
| 6,552,706 B1 | 4/2003 | Ikeda et al. | |
| 2007/0132684 A1* | 6/2007 | Baek et al. | ...................... 345/87 |
| 2011/0241979 A1 | 10/2011 | Baek et al. | |
| 2013/0027439 A1* | 1/2013 | Kim et al. | ..................... 345/690 |

FOREIGN PATENT DOCUMENTS

| | | |
|---|---|---|
| CN | 1979318 | 6/2007 |
| CN | 101303500 | 11/2008 |
| CN | 102809856 A | 12/2012 |

* cited by examiner

*Primary Examiner* — Gerald Johnson
*Assistant Examiner* — Maheen Javed
(74) *Attorney, Agent, or Firm* — WPAT, PC; Justin King

(57) ABSTRACT

An array substrate of a display panel is provided with a new layout design. The array substrate includes a plurality of sub-pixel groups, a plurality of switching devices, a pair of first data lines, and a plurality of scan lines. Each of the sub-pixel group comprises a first sub-pixel group and a second sub-pixel group. Each of the first sub-pixel group and the second sub-pixel group comprises a first, a second, a third sub-pixel, and is disposed in a first column. The first, the second, and the third sub-pixels are having different voltages while the array substrate of a display panel is displaying in a two-dimensional (2D) mode.

32 Claims, 11 Drawing Sheets

US 9,087,472 B2

ARRAY SUBSTRATE OF A DISPLAY PANEL AND THE DRIVING METHOD THEREOF

RELATED APPLICATIONS

This application claims priority to Taiwan Application Serial Number 101145086, filed Nov. 30, 2012, which is herein incorporated by reference.

BACKGROUND

1. Technical Field

The present disclosure relates to a substrate, and more particularly, to an active array substrate of a display panel.

2. Description of Related Art

Liquid crystal display (LCD) panel has become the mainstream of display device for its advantages of like low radiation, low power consumption, and thinness. As such, various techniques corresponding to various demands have been developed. In particular, technique of three-dimensional (3D) image displaying is one of the devoted topics. The 3D image displaying utilizes the visual characteristic of human eyes. When two images with the same content but different parallax are separately seen by the left eye and right eye, a 3D image is sensed (viewed). In current technique of 3D image, when a display panel displays a image for left eye and image for right eye simultaneously, it is possible to let left eye (or right eye) receives both kinds of images, and it means the cross-talk phenomenon. Besides, color washout is also a general issue of a display panel in its 3D display mode, the issue would decrease the display quality of the display panel. Therefore, extra masks for forming corresponding layers, such as a mask of pixel electrode and that of black matrix, are often adopted to overcome aforementioned issues. However, it causes high cost of manufacturing a display panel.

SUMMARY

The present disclosure relates to an array substrate of a display panel, which has a whole new design of pixel layout. The masks for 2D display mode are also the masks for 3D display mode of the display panel. Common masks for both 2D and 3D display mode effectively reduce the cost of manufacturing a display panel, furthermore, the color washout issue of 3D display mode in wider viewing angle is also improved.

The present disclosure, in one aspect, relates to an array substrate of a display panel comprises a plurality of sub-pixel groups, a plurality of switches, a pair of first data lines, and a plurality of scan lines. The plurality of sub-pixel groups at least comprises a first sub-pixel group and a second sub-pixel group, both the first sub-pixel group and the second sub-pixel group individually at least have a first sub-pixel, a second sub-pixel, and a third sub-pixel respectively, the first sub-pixel group and the second sub-pixel group are disposed in a first column; the plurality of switches are individually disposed in the first, second, third sub-pixel of the first sub-pixel group and the second sub-pixel group respectively; the pair of first data lines is disposed in at least one side of the first sub-pixel group and the second sub-pixel group, wherein the respective switches of the first sub-pixel and the third sub-pixel of the first sub-pixel group and the switch of the second sub-pixel of the second sub-pixel group are individually connected to one data line of the pair of first data lines, and the switch of the second sub-pixel of the first sub-pixel group and the respective switches of the first sub-pixel and the third sub-pixel of the second sub-pixel group are individually connected to the other data line of the pair of first data lines; and the plurality of scan lines comprises at least a first, second and third scan lines which are interlaced to the pair of first data lines, wherein the switches of the first sub-pixel and the second sub-pixel of the first sub-pixel group are individually connected to the first scan line, the switches of the third sub-pixel of the first sub-pixel group and the first sub-pixel of the second sub-pixel group are individually connected to the second scan line, and the switches of the second sub-pixel and the third sub-pixel of the second sub-pixel group are connected to the third scan line, wherein each of the first, second, third sub-pixel of the first and second sub-pixel groups has different voltages in 2D display mode.

In one embodiment, the voltages of the first sub-pixel of the first and second sub-pixel groups are greater than those of the second sub-pixel of the first and second sub-pixel groups, and the voltages of the third sub-pixel of the first and second sub-pixel groups are less than those of the second sub-pixel of the first and second sub-pixel groups.

In one embodiment, the switches of the first and third sub-pixel of the first sub-pixel group and the switch of the second sub-pixel of the second sub-pixel group are connected to one data line of the pair of the first data lines, but not connected to the other data line of the pair of first data lines, and the switch of the second sub-pixel of the first sub-pixel group and the switches of the first and third sub-pixel of the second sub-pixel groups are individually connected to the other data line of the pair of first data lines, but not connected to the one data line of the pair of first data lines.

In one embodiment, the first sub-pixels of the first, second sub-pixel group are disabled, and the second and third sub-pixels of the first and second sub-pixel groups are enabled in 3D display mode of the array substrate array substrate.

In one embodiment, the third sub-pixel of the first sub-pixel group and the first sub-pixel of the second sub-pixel group are disabled, and the first, second sub-pixel of the first sub-pixel group and the second, third sub-pixel of the second sub-pixel group are enabled in 3D display mode of the array substrate In one embodiment, the plurality of sub-pixel groups further comprise a third sub-pixel group and a fourth sub-pixel group, the respective third sub-pixel group and the fourth sub-pixel group at least have a first sub-pixel, a second sub-pixel, and a third sub-pixel, the third sub-pixel group and the fourth sub-pixel group are disposed in a second column, the first and the third sub-pixel groups are arranged in one row, the second and the fourth sub-pixel groups are arranged in the other row; and the plurality of switches further comprises switches individually disposed in the first, second and third sub-pixel of the third and fourth sub-pixel group, wherein the switches of the first, second sub-pixel of the third sub-pixel group are connected to the first scan line, the switches of the third sub-pixel of the third sub-pixel group and the first sub-pixel of the fourth sub-pixel group are connected to the second scan line, and the switches of the second, third sub-pixel of the fourth sub-pixel group are connected to the third scan line; and the array substrate further comprises a pair of second data lines, the pair of second data lines is substantially parallel to the pair of first data lines, and is disposed in at least one side of the third, fourth sub-pixel group which is interlaced to the first, second, third scan line, wherein the switches of the first, third sub-pixel of the third sub-pixel group and the switch of the second sub-pixel of the fourth sub-pixel group are connected to one of the pair of second data lines, and the switch of the second sub-pixel of the third sub-pixel group and the switches of the first, third sub-pixel of the fourth sub-pixel group are connected to the other one of the pair of second data lines.

In one embodiment, connection positions of each switch of each sub-pixel of the third, fourth sub-pixel groups and the pair of second data lines are mirror symmetry to those of each switch of each sub-pixel of the first, second sub-pixel groups and the pair of first data lines, and boundary of the first column and the second column is the symmetry axis.

In one embodiment, the voltages of the first sub-pixel of the third, fourth sub-pixel groups are greater than those of the second sub-pixel of the third, fourth sub-pixel groups, and the voltages of the third sub-pixel of the third, fourth sub-pixel groups are less than those of the second sub-pixel of the third, fourth sub-pixel groups.

In one embodiment, the first sub-pixels of the third and fourth sub-pixel groups are disabled, and the second and third sub-pixels of the third and fourth sub-pixel groups are enabled in 3D display mode of the array substrate.

In one embodiment, the third sub-pixel of the third sub-pixel group and the first sub-pixel of the fourth sub-pixel group are disabled, and the first, second sub-pixel of the third sub-pixel group and the second, third sub-pixel of the fourth sub-pixel group are enabled in 3D display mode of the array substrate.

In one embodiment, the switches of the first, third sub-pixel of the third sub-pixel group and the switch of the second sub-pixel of the fourth sub-pixel group are connected to one data line of the pair of the second data lines, but not connected to the other data line of the pair of second data lines, and the switch of the second sub-pixel of the third sub-pixel group and the switches of the first, third sub-pixel of the fourth sub-pixel group are connected to the other data line of the pair of second data lines, but not connected to the one data line of the pair of second data lines.

The present disclosure, in another aspect, relates to a driving method of a array substrate of a display panel. The method comprises: providing the array substrate aforementioned, providing a plurality of voltages in a plurality of time sequences to the first data line, and charging the respective one of the first, second, third sub-pixel of the first, second sub-pixel group by turning on the plurality of scan lines in each corresponding time sequence to let each of the first, second, third sub-pixel of the first and second sub-pixel groups having different voltages respectively in 2D display mode.

In one embodiment, the plurality of time sequences comprise a first time sequence, a second time sequence, and a third time sequence, the plurality of voltages comprise a first voltage, a second voltage, and a third voltage, wherein the voltage provided to one of the pair of first data lines is different from that to the other one of the pair of first data lines in each time sequence.

In one embodiment, the first, second sub-pixel of the first sub-pixel group are enabled in the first time sequence to let the first sub-pixel of the first sub-pixel group have the first voltage and the second sub-pixel of the first sub-pixel group have the second voltage, wherein the first voltage is greater than the second voltage, the third sub-pixel of the first sub-pixel group and the first sub-pixel of the second sub-pixel group are enabled in the second time sequence to let the third sub-pixel of the first sub-pixel group have the third voltage and the first sub-pixel of the second sub-pixel group have the first voltage, wherein the first voltage is greater than the third voltage, the second sub-pixel of the second sub-pixel group and the third sub-pixel of the second sub-pixel group are enabled in the third time sequence to let the second sub-pixel of the second sub-pixel group have the second voltage and the third sub-pixel of the second sub-pixel group have the third voltage, wherein the second voltage is greater than the third voltage.

In one embodiment, the first voltage is less than the enabling voltage of the first sub-pixel of the first, second sub-pixel groups, each second voltage is greater than the enabling voltage of the second sub-pixel of the first and second sub-pixel groups, the third voltage is greater than the enabling voltage of the third sub-pixel of the first, second sub-pixel groups in any of the time sequences of 3D mode of the array substrate of the display panel.

In one embodiment, the third voltage for the third sub-pixel of the first sub-pixel group, and the first voltage for the first sub-pixel of the second sub-pixel group are less than the enabling voltage of for the third sub-pixel of the first sub-pixel group and the first sub-pixel of the second sub-pixel group respectively.

BRIEF DESCRIPTION OF THE DRAWINGS

The disclosure may be more fully understood by reading the following detailed description of the embodiment, with reference made to the accompanying drawings as follows.

DETAILED DESCRIPTION

Figure 1A:
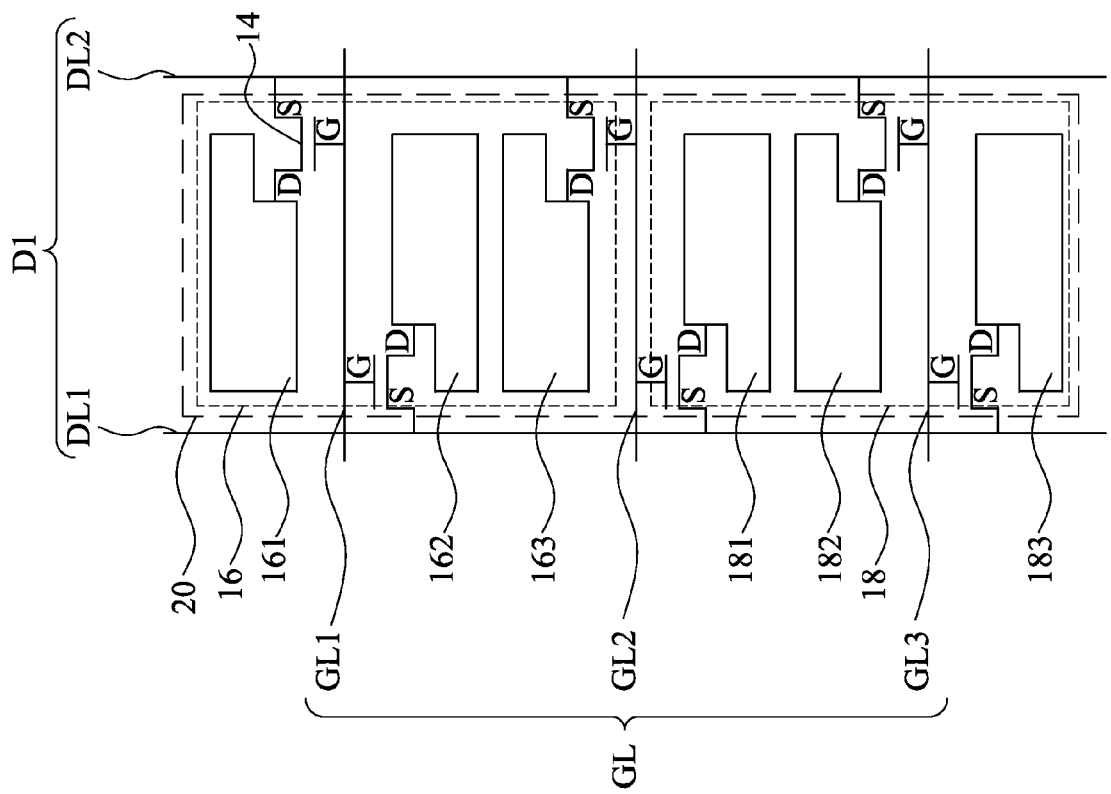
FIG. 1A illustrates a top-view of a part of one embodiment of the pixel layout of the array substrate of the present disclosure.

The present disclosure is described by the following specific embodiments. Those with ordinary skill in the arts can readily understand the other advantages and functions of the present invention after reading the disclosure of this specification. The present disclosure can also be implemented with different embodiments. Various details described in this specification can be modified based on different viewpoints and applications without departing from the scope of the present disclosure.

As used herein, the singular forms "a," "an" and "the" include plural referents unless the context clearly dictates otherwise. Therefore, reference to, for example, a data sequence includes aspects having two or more such sequences, unless the context clearly indicates otherwise.

Reference will now be made in detail to the embodiments of the present disclosure, examples of which are illustrated in the accompanying drawings. Wherever possible, the same reference numbers are used in the drawings and the description to refer to the same or like parts.

Figure 1B:
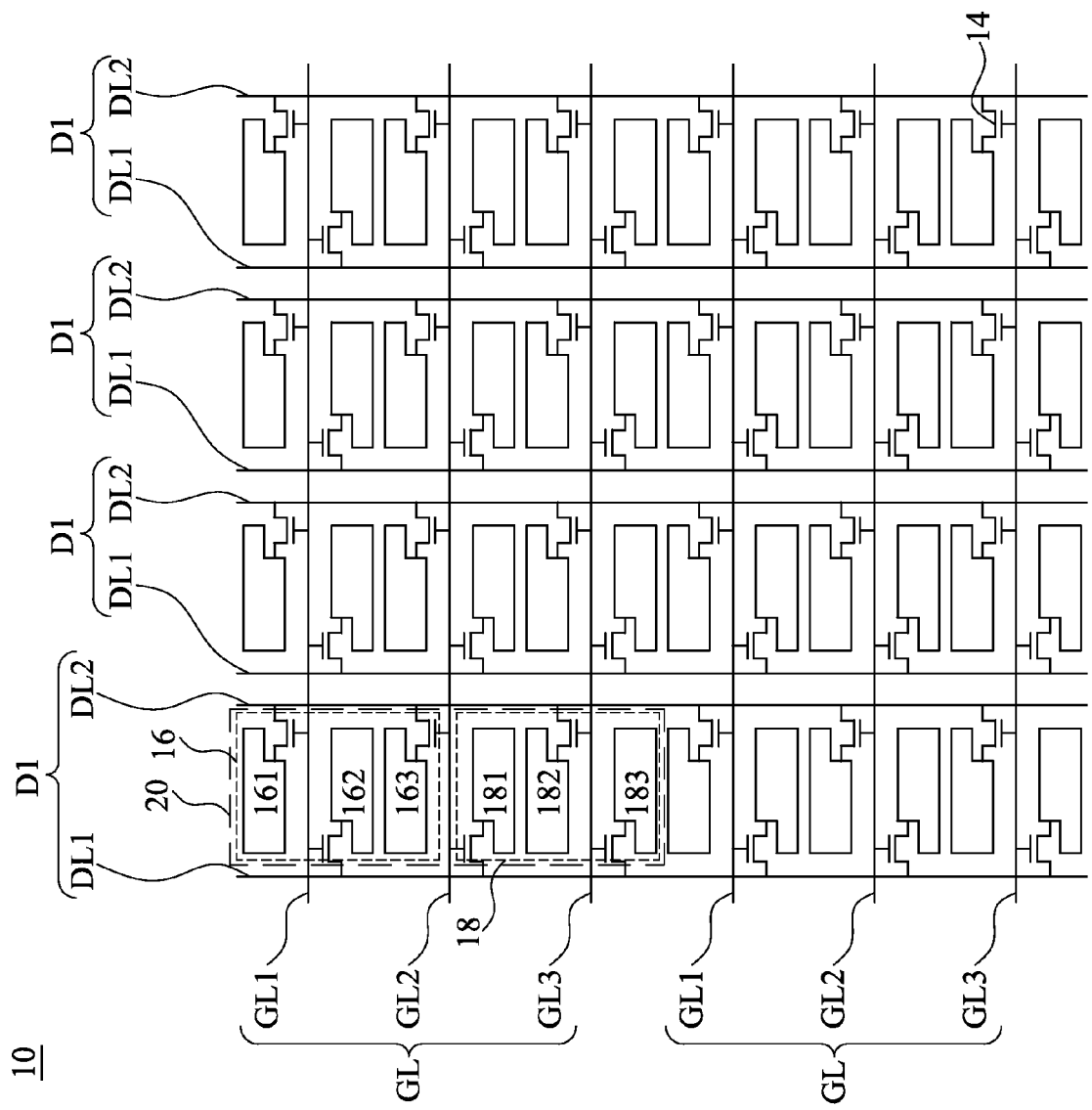
FIG. 1B illustrates a top-view of a part of one embodiment of the pixel layout of the array substrate of the present disclosure.

FIG. 1A and FIG. 1B are both top-view of a part of one embodiment of the pixel layout of the array substrate of the present disclosure. FIG. 1A illustrates an enlarged view of the part of the pixel layout of the array substrate shown in FIG. 1B. And FIG. 1B is composed of a repeating unit, FIG. 1A. That is, eight repeating units (FIG. 1A) are shown in four columns of the array substrate in FIG. 1B. Each column has two repeating units (FIG. 1A). To describe and illustrate clearly, labels of each element are only labeled in the repeating unit at the upper left corner of FIG. 1B and following FIG. 2-5. Besides, time of repeating of the repeating unit (FIG. 1A) depends on each design of each following illustration.

Referring to FIG. 1B first, the array substrate 10 comprises a plurality of sub-pixel groups 20, a plurality of switches 14, pairs of first data lines D1 (composed by DL1 and DL2), and a plurality of scan lines GL1, GL2, GL3.

Referring to the repeating unit of FIG. 1B, FIG. 1A, each sub-pixel group 20 of aforementioned array substrate 10 comprises a first sub-pixel group 16 and second sub-pixel group 18, wherein the first sub-pixel group 16 has a first sub-pixel 161, a second sub-pixel 162, and a third sub-pixel 163; the second sub-pixel group 18 has a first sub-pixel 181, a second sub-pixel 182, and a third sub-pixel 183. The first sub-pixel 161, the second sub-pixel 162, and the third sub-pixel 163 of the first sub-pixel group 16, and the first sub-pixel 181, the second sub-pixel 182, and the third sub-pixel 183 of the second sub-pixel group 18 are all disposed in a first column (or namely all sub-pixels are disposed in the same column).

Referring to FIG. 1A and FIG. 1B together, a switch 14 is disposed in each of the sub-pixel respectively. The voltages of each of the sub-pixel are controlled by turning on (or namely enabling) or turning off (or namely disabling) its corresponding switch 14. Switch 14 is a transistor, which can be constructed by a gate electrode G, a semiconductor layer (not labeled), a source electrode S, and a drain electrode D. The gate electrode G is connected to a scan line GL, the source electrode S is connected to a data line D1, and the drain electrode D is connected to a sub-pixel. By inputting a signal to turn on the gate electrode G of switch 14, the voltage of source electrode S (from data line D1) can be inputted into the sub-pixel through the drain electrode D, and optical transmittance of the sub-pixel is controlled. Wherein the type of the transistor can be top-gate type transistors, bottom-gate transistors, or other suitable transistor type, and the material of the semiconductor layer can be amorphous semiconductor, polycrystalline semiconductor, single crystal semiconductor, microcrystalline semiconductor, nanocrystalline semiconductor, oxide semiconductor, organic semiconductor, quantum dot semiconductor, or other suitable materials, or at least two of aforementioned semiconductor combination. Among them, the top-gate type transistor is the gate electrode in the top of the semiconductor layer, and the bottom-gate transistor in the semiconductor layer below the gate electrode. Each switch 14 of each sub-pixel is electrically connected to the pair of first data lines D1 (DL1 and DL2). The pair of first data lines D1 (DL1 and DL2) can be disposed in two sides of the first sub-pixel group 16 and the second sub-pixel group 18 preferably, that is, the first sub-pixel group 16 and the second sub-pixel group 18 are disposed in the first column (or namely the same column) which is defined by the pair of first data lines D1 (DL1 and DL2) as shown in FIG. 1A and FIG. 1B, but not limited to it. In other embodiments of the present disclosure, DL1 and DL2 can be disposed in the same side of the first sub-pixel group 16 and the second sub-pixel group 18. Therefore, the first sub-pixel group 16 and the second sub-pixel group 18 are arranged along with the extending direction of the pair of first data lines DL1 and DL2. It should be noticed is that, the connecting relation of the switch 14 of each sub-pixel and the pair of first data lines D1 (DL1 and DL2) is shown in FIG. 1A. DL1 of the pair of first data lines D1 is connected to the switch 14 of the second sub-pixel 162 of the first sub-pixel group 16, the switch 14 of the first sub-pixel 181 of the second sub-pixel group 18, and the switch 14 of the third sub-pixel 183 of the second sub-pixel group 18, while DL2 of the pair of first data lines D1 is connected to the switches 14 of the first sub-pixel 161 of the first sub-pixel group 16, the switches 14 of the third sub-pixel 163 of the first sub-pixel group 16, and the switches 14 of the second sub-pixel 182 of the second sub-pixel group 18, but not limited to it. Specifically, each switch 14 of each sub-pixels 161, 162, 163, 181, 182, 183 in the first column is connected to the pair of first data lines D1 in a zigzag manner. In FIG. 1B, for example, the data line of the pair of data lines D1 connected to the first, second, third sub-pixel of the first sub-pixel group 16 in the first column, and the first, second, third sub-pixel of the second sub-pixel group 18 in the first column is DL2, DL1, DL2, DL1, DL2, DL1 in order (from top to bottom), but the connection is not limited to it. In the connection of aforementioned switches 14 and the pair of first data lines D1, data line D1 and data line D2 are exchangeable, for example, the data line of the pair of data lines D1 connected to the first, second, third sub-pixel of the first sub-pixel group 16 in the first column, and the first, second, third sub-pixel of the second sub-pixel group 18 in the first column can also be DL1, DL2, DL1, DL2, DL1, DL2 in order (from top to bottom).

Referring to FIG. 1A and FIG. 1B together, the array substrate 10 of the present embodiment comprises at least one set of scan line GL, the set of scan line GL at least comprises a first scan line GL1, a second scan line GL2, and a third scan line GL3. All scan lines of the set of scan line GL are crossed (or namely interlaced) to the pair of first data lines D1 (DL1, DL2). Wherein the gate electrode G of the switch 14 of the first sub-pixel 161 of the first sub-pixel group 16 and the gate electrode G of the switch 14 of the second sub-pixel 162 of the first sub-pixel group 16 are connected to the first scan line GL1; the gate electrode G of the switch 14 of the third sub-pixel 163 of the first sub-pixel group 16 and the gate electrode G of the switch 14 of the first sub-pixel 181 of the second sub-pixel group 18 are connected to the second scan line GL2; the gate electrode G of the switch 14 of the second sub-pixel 182 of the second sub-pixel group 18 and the gate electrode G of the switch 14 of the third sub-pixel 183 of the second sub-pixel group 18 is connected to the third scan line GL3. More specifically, each scan line GL1, GL2, and GL3 is respectively connected to each switch of two adjacent sub-pixels which are in the same column but different rows. As shown in FIGS. 1A and 1B, the first sub-pixel group 16 and the second sub-pixel group 18 within the sub-pixel group 20 are in the same column and are corresponded to six switches 14 totally. These six switches 14 disposed respectively in six sub-pixels (161, 162, 163, 181, 182, 183) are distributed evenly to three scan lines (GL1, GL2, GL3). That is, GL1 is connected to the gate electrodes G of the switches of sub-pixel 161,162; GL2 is connected to the gate electrodes G of the switches of sub-pixel 163,181; GL3 is connected to the gate electrodes G of the switches of sub-pixel 182,183. It should be noticed that each sub-pixel of each sub-pixel group of the array substrate of the present disclosure has aforementioned whole new layout. With the following driving method, each sub-pixel of each sub-pixel group can be independently charged with different voltages in different time sequences, so as to let each sub-pixel of each sub-pixel group have different voltages directly. It is totally different from the prior art, which applies charge-sharing among each sub-pixel of each sub-pixel group to produce different voltages of them, the present disclosure provides a more direct and better solution to color-washout issue in wide viewing-angle than that of the related art.

FIG. 1B is top-view of part of one embodiment of the pixel layout of the array substrate of the present disclosure, the array substrate comprises the plurality of sub-pixel groups 20, the plurality of switches 14, pairs of first data lines D1 (DL1, DL2), and the plurality of scan lines GL1, GL2, GL3. It should be noticed is that the array substrate of the present disclosure is composed of at least two different columns with different display colors. As shown in FIG. 1B, the sub-pixel groups of the first, third columns (counted from left to right) display a first colored light; the sub-pixel groups of the second, fourth columns (counted from left to right) display a second colored light, wherein the combination of the first, second colored light could be that the first colored light is one of the three primary colors of light and the second colored light is the mixed colored light of the other two of the three primary colors of light. For example, the first colored light is red light and the second colored light is mixed colored light of green and blue, or the first colored light is mixed colored light of red and green and the second colored light is mixed colored light of green and blue, or other suitable combinations of color from CIE. As long as the combination comprises the three primary color of light (red, green, and blue), the display panel of the present disclosure is capable to display all kinds of predetermined color. To be more specific, the array substrate of the present disclosure is consisting at least two sub-pixel groups with different color in two different columns respectively. That is, the array substrate of the present disclosure can also comprises two, three, four, five, six different sub-pixel groups with different colors in different columns respectively, and the colors of each sub-pixel of the sub-pixel group in the same column are substantially the same.

Figure 2:
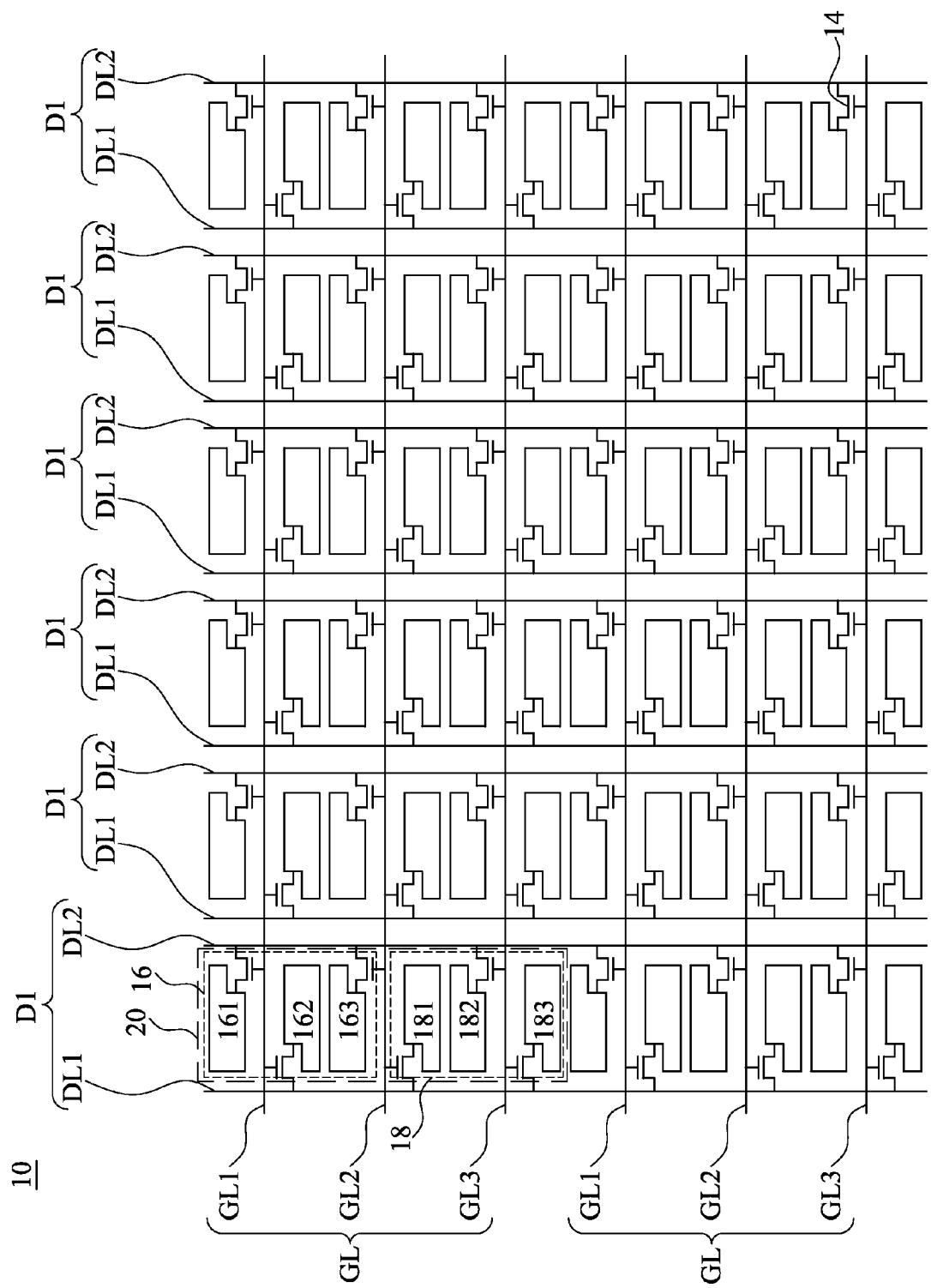
FIG. 2 illustrates a top-view of a part of one embodiment of the pixel layout of the array substrate of the present disclosure.
Figure 3:
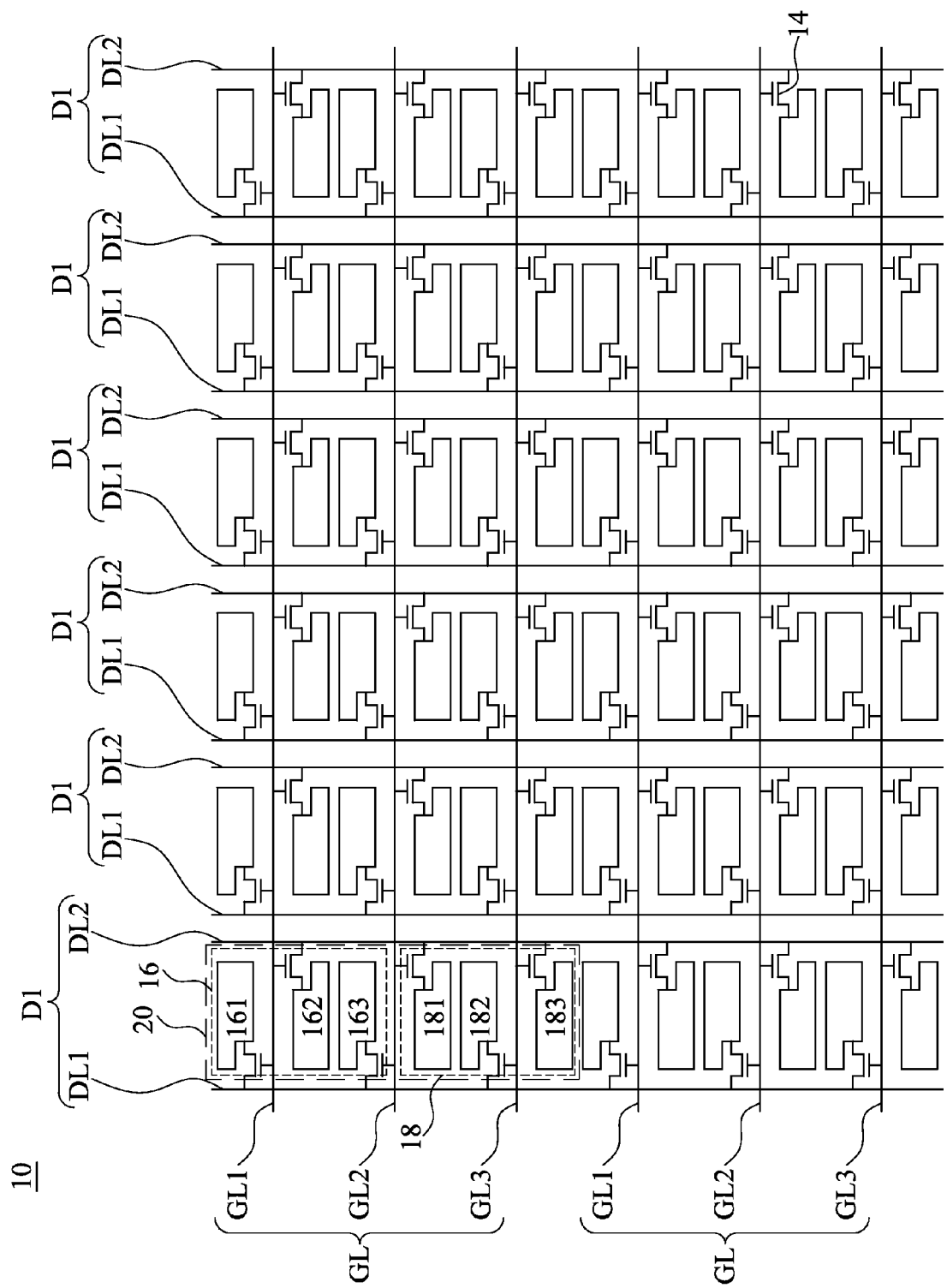
FIG. 3 illustrates a top-view of a part of another embodiment of the pixel layout of the array substrate of the present disclosure.

For convenience of description, the following embodiments of the present invention are described in three primary color of light (red, green, and blue) in three different columns of the array substrate as examples. As shown in FIG. 2, the sub-pixel groups of the first, fourth columns (from left to right) display the first colored light, the sub-pixel groups of the second, fifth columns (from left to right) display the second colored light, and the third, sixth columns (from left to right) display the third colored light. For example, the first colored light is red light, the second colored light is green light, and the third colored light is blue light, but not limited to it. That is the corresponding colors of the first, second, and third colored light are exchangeable, as long as the combination of the first, second, and third colored light contents three primary colors of light (red, green, and blue), the display panel of the present disclosure is capable to display all kinds of color. Besides, data line DL1 and data line DL2 of the pair of first data lines are exchangeable as aforementioned. That is, the connecting relation of aforementioned switches 14 and the pair of first data lines D1, data line D1 and data line D2 are exchangeable, as the array substrate 10 of the present disclosure shown in FIG. 3, the data line of the pair of data lines D1 connected to the first, second, third sub-pixels of the first sub-pixel group 16 in the first column, and the first, second, third sub-pixels of the second sub-pixel group 18 in the first column can also be DL1, DL2, DL1, DL2, DL1, DL2 in order (from top to bottom).

Referring to FIG. 2 continually, the driving method of the array substrate of the embodiment of the present disclosure is to offering a plurality of voltages to the pair of first data lines (DL1, DL2) in a plurality of time sequences. In the present embodiment, the pair of first data lines (DL1, DL2) are offered three different voltages in three different time sequences respectively. Take the array substrate in FIG. 1B as an example, in the first time sequence (or namely first time clock), data line DL1 is offered a second voltage to supply the voltage which is predetermined for the second sub-pixel 162 of the first sub-pixel group 16, meanwhile (in the first time sequence), data line DL2 is offered a first voltage to supply the voltage which is predetermined for the first sub-pixel 161 of the first sub-pixel group 16; in the second time sequence, data line DL1 is changed to be offered a first voltage to supply the voltage which is predetermined for the first sub-pixel 181 of the second sub-pixel group 18, meanwhile (in the second time sequence), data line DL2 is changed to be offered a third voltage to supply the voltage which is predetermined for the third sub-pixel 163 of the first sub-pixel group 16; in the third time sequence, data line DL1 is changed to be offered a third voltage to supply the voltage which is predetermined for the third sub-pixel 183 of the second sub-pixel group 18, meanwhile (in the third time sequence), data line DL2 is changed to be offered a second voltage to supply the voltage which is predetermined for the second sub-pixel 182 of the first sub-pixel group 18. To be more specific, the voltages offered to data line DL1 is changeable to supply the second, first, and third voltages in the first, second, and third time sequence respectively; and the voltages offered to data line DL2 is also changeable to supply the first, third, and second voltages in the first, second, and third time sequence respectively. Accordingly, the voltages supplied by data line DL1, DL2 in different time sequence are different from each other. In the first, second, and third time sequences, the predetermined voltages for the first, second, and third sub-pixel of the first sub-pixel group 16 and the second sub-pixel group 18 of the sub-pixel group 20 are fully charged respectively by the second, first, and third voltage supplied by data line DL1 and the first, third, and second voltage supplied by data line DL2. It should be noticed that each sub-pixel of the first sub-pixel group 16 and the second sub-pixel group 18 in two adjacent rows are fully charged to having their predetermined voltages respectively then the predetermined image of them is shown while the first, second, and third time sequences are all completed. Therefore, the first, second, and third time sequences are all respectively a part of time of a frame which the frame. Referring to FIG. 1B, when the scan lines GL1, GL2, and GL3 are turned on in aforementioned the first, second, and third time sequences respectively, each the first, second, and third sub-pixel of the first, second sub-pixel groups (such as 161 and 181, 162 and 182, and 163 and 183) is charged to have a voltage above (or namely greater than) the threshold voltage thereof respectively by switching three kinds of voltages of the data lines, DL1 and DL2. The threshold voltage is the minimum voltage which forces the liquid crystal molecules in each sub-pixel to rotate and to start having optical transmittance. When a sub-pixel substantially has a voltage greater than its threshold voltage, the higher the voltage is, the greater the optical transmittance of the sub-pixel is. The voltage is proportional to the optical transmittance until the optical transmittance of the sub-pixel reaches its maximum, and the voltage of it is called the saturated voltage. It should be noticed that the first voltage, the second voltage, and the third voltage are different from each other. When the array substrate of the display panel of one embodiment of the present disclosure is in its 2D mode (or namely two dimension display mode), the first, second, and the third sub-pixel of the first sub-pixel group and the second sub-pixel group are having different voltages respectively. That is, the voltages of the first sub-pixel 161, the second sub-pixel 162, and the third sub-pixel 163 are different from each other; and the voltages of the first sub-pixel 181, the second sub-pixel 182, and the third sub-pixel 183 are also different from each other. The first voltage, the second voltage, and the third voltage are all substantially greater than the threshold voltages of each sub-pixels. To be more specific, each sub-pixel of each sub-pixel group has a voltage which is greater than its threshold voltage, and therefore each sub-pixel has a optical transmittance. The sub-pixels have different voltages, and the degrees of their optical transmittance are also different. It results in that the sub-pixels display different intensity of light from each other.

Furthermore, in one embodiment of the present disclosure, when the array substrate of the display panel is in 2D mode, except all sub-pixels of all sub-pixel groups have voltages above (or namely greater than) their threshold voltages, the first voltage is substantially greater than the second voltage, and the second voltage is substantially greater than the third voltages. Therefore, when the array substrate of the display panel of the present disclosure is in 2D mode, the voltages of the first sub-pixel (161, 181) are substantially greater than those of the second sub-pixel (162, 182) and the voltages of the second sub-pixel (162, 182) are substantially greater than those of the third sub-pixel (163, 183). That is, the voltage of the first sub-pixel 161 is substantially greater than that of the second sub-pixel 162, and the voltage of the second sub-pixel 162 is substantially greater than that of the third sub-pixel 163; the voltage of the first sub-pixel 181 is substantially greater than that of the second sub-pixel 182, and the voltage of the second sub-pixel 182 is substantially greater than that of the third sub-pixel 183. Therefore, all sub-pixels of the display panel have different optical transmittances. In each sub-pixel group, the brightness of the first sub-pixel is the highest, that of the second sub-pixel is secondary, and that of the third sub-pixel is the lowest. When aforementioned sub-pixel groups are all enabled, all sub-pixels of the first sub-pixel group 16 display the same color of light, and so do all sub-pixels of the second sub-pixel group 18. Preferably, the first sub-pixel group 16 and the second sub-pixel group 18 display the same color of light.

Figure 4:
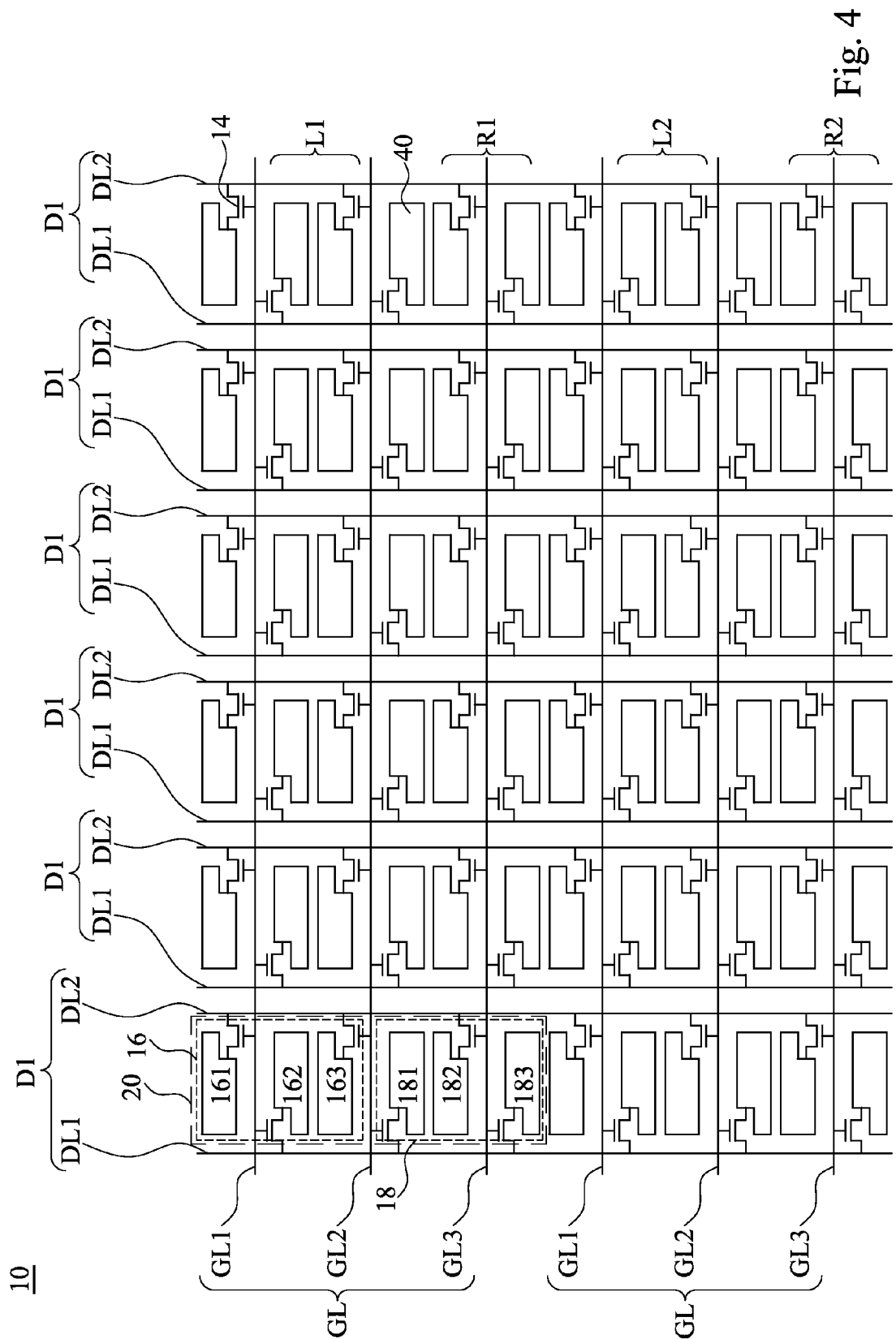
FIG. 4 illustrates a top-view of a part of another embodiment of the pixel layout of the array substrate of the present disclosure.

Referring to FIG. 4, in one embodiment of the present disclosure, when the array substrate of the display panel is in 3D mode (or namely stereographic display mode, three dimension display mode), there are black regions (or namely light shading region) 40 between the sub-pixels for left eye and right eye of the observer to separate the images displayed, and to avoid the issue of cross-talk. The issue of cross-talk occurs when the right eye observes the wrong images, which are predetermined for the left eye, vice versa. As shown in FIG. 4, when the array substrate 10 of the display panel is in 3D display mode, just allow the first voltage offered by the pair of first data lines D1 (DL1, DL2) in each time sequence substantially to be less than the threshold voltages of the first sub-pixels of each sub-pixel group according to aforementioned driving method. So as the first sub-pixels 161, 181 are not enabled (or namely disabled) in each time sequence and become the black regions 40 respectively. Meanwhile, the second voltage is still substantially greater than the threshold voltages of the second sub-pixels 162, 182, and the third voltage is still substantially greater than the threshold voltages of the third sub-pixels 163, 183. That is, the second sub-pixels (162,182) and the third sub-pixels (163, 183) are enabled and having optical transmittances. Referring to FIG. 4, in one embodiment of the present disclosure, the second sub-pixel 162 of the first sub-pixel group 16 and the third sub-pixel 163 of the first sub-pixel group 16 offer the display images (L1, L2) for left eye of observers, and the second sub-pixel 182 of the second sub-pixel group 18 and the third sub-pixel 183 of the second sub-pixel group 18 offer the display images (R1, R2) for right eye of observers. The first sub-pixel 161 of the first sub-pixel group 16 and the first sub-pixel 181 of the second sub-pixel group 18 are opaque and become the black regions 40 to separate the images from the sub-pixels which are predetermined to offer the images for right eye and left eye respectively since the first sub-pixel 161 of the first sub-pixel group 16 and the first sub-pixel 181 of the second sub-pixel group 18 are having voltages which are lower than their threshold voltages. So the issue of cross-talk is avoided and the display quality in 3D mode of the array substrate of the display panel of the present disclosure is improved.

Figure 5:
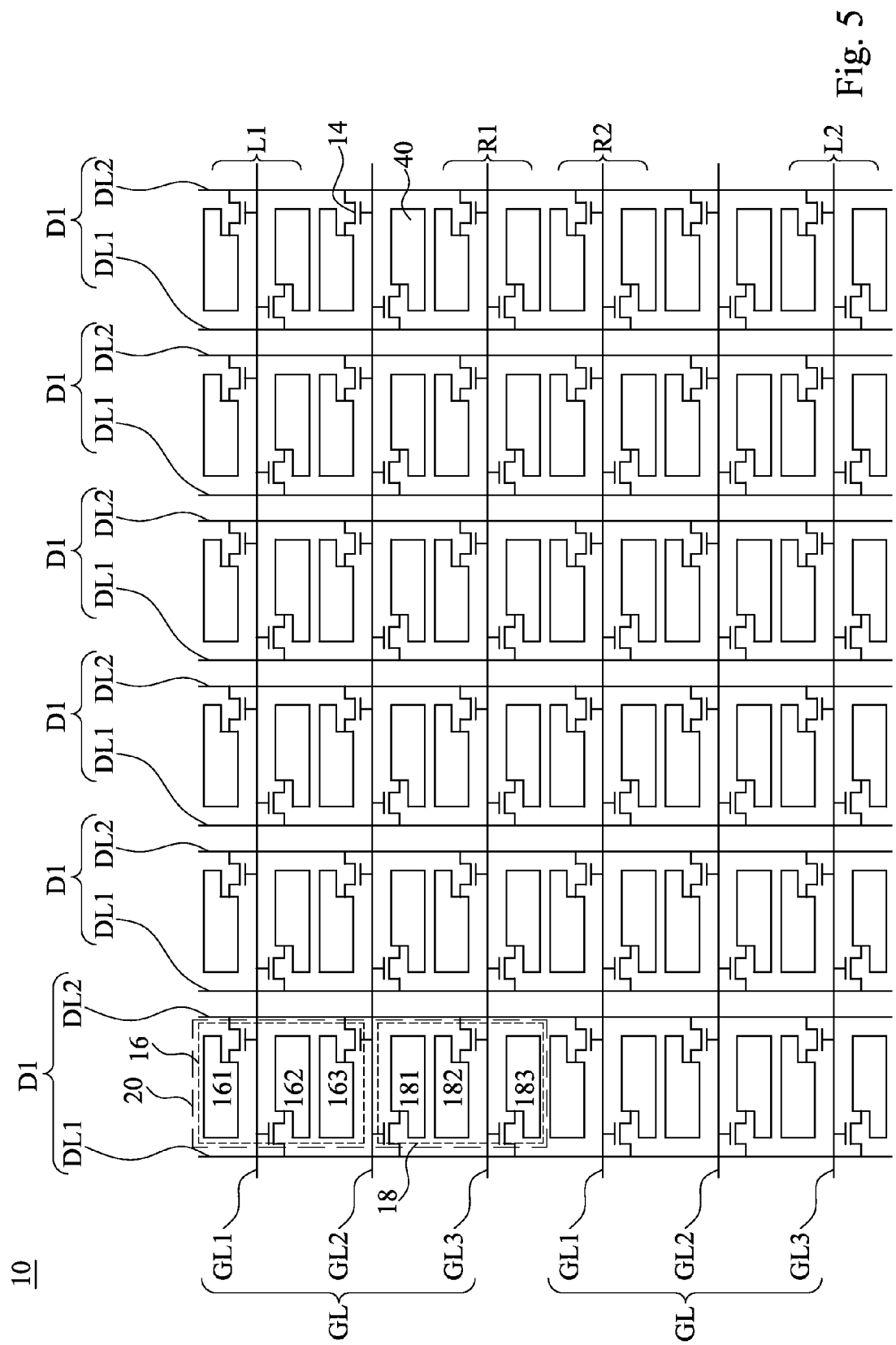
FIG. 5 illustrates a top-view of a part of another embodiment of the pixel layout of the array substrate of the present disclosure.

Referring to FIG. 5, in one embodiment of the present disclosure, the array substrate of the display panel has wider black regions 40 to avoid aforementioned issue of cross-talk which could happened in 3D mode observed by wider view angles. As shown in FIG. 5, when the array substrate 10 of the display panel is in 3D display mode, just allow the third voltage and the first voltage offered by the pair of first data lines D1 (DL1, DL2) in the second time sequence substantially to be less than the threshold voltages of the third sub-pixel 163 of the first sub-pixel group 16 and the first sub-pixel 181 of the second sub-pixel group 18 according to aforementioned driving method. So as the third sub-pixel 163 of the first sub-pixel group 16 and the first sub-pixel 181 of the second sub-pixel group 18 are not enabled in each time sequence (since the second time sequence is the only chance for them to be charged) and become the black regions 40 respectively. Meanwhile, the second voltage and the first voltage offered by the pair of first data lines D1 (DL1, DL2) in the first time sequence are substantially greater than the threshold voltages of the second sub-pixel 162 of the first sub-pixel group 16 and the first sub-pixel 161 of the first sub-pixel group 16; the third voltage and the second voltage offered by the pair of first data lines D1 (DL1, DL2) in the third time sequence are substantially greater than the threshold voltages of the third sub-pixel 183 of the second sub-pixel group 18 and the second sub-pixel 182 of the second sub-pixel group 18. As shown in FIG. 5, the first sub-pixel 161 and the second sub-pixel 162 of the first sub-pixel groups 16 display the images L1 which is predetermined for left eye of the observer; and the second sub-pixel 182 and the third sub-pixel 183 of the second sub-pixel groups 18 display the images R1 which is predetermined for right eye of the observer. The third sub-pixel 163 of the first sub-pixel group 16 and the first sub-pixel 181 of the second sub-pixel group 18 are opaque as black regions 40 because of having the voltages which are substantially less than their threshold voltages respectively. Accordingly, the embodiment of the present disclosure shown in FIG. 5 has wider black regions 40 than those of the embodiment of the present disclosure shown in FIG. 4. That is, the issue of cross-talk can be avoid even when the array substrate of the display panel is in 3D mode and being observed in wider view angles. Therefore, a better quality of 3D images can be achieved.

Figure 6A:
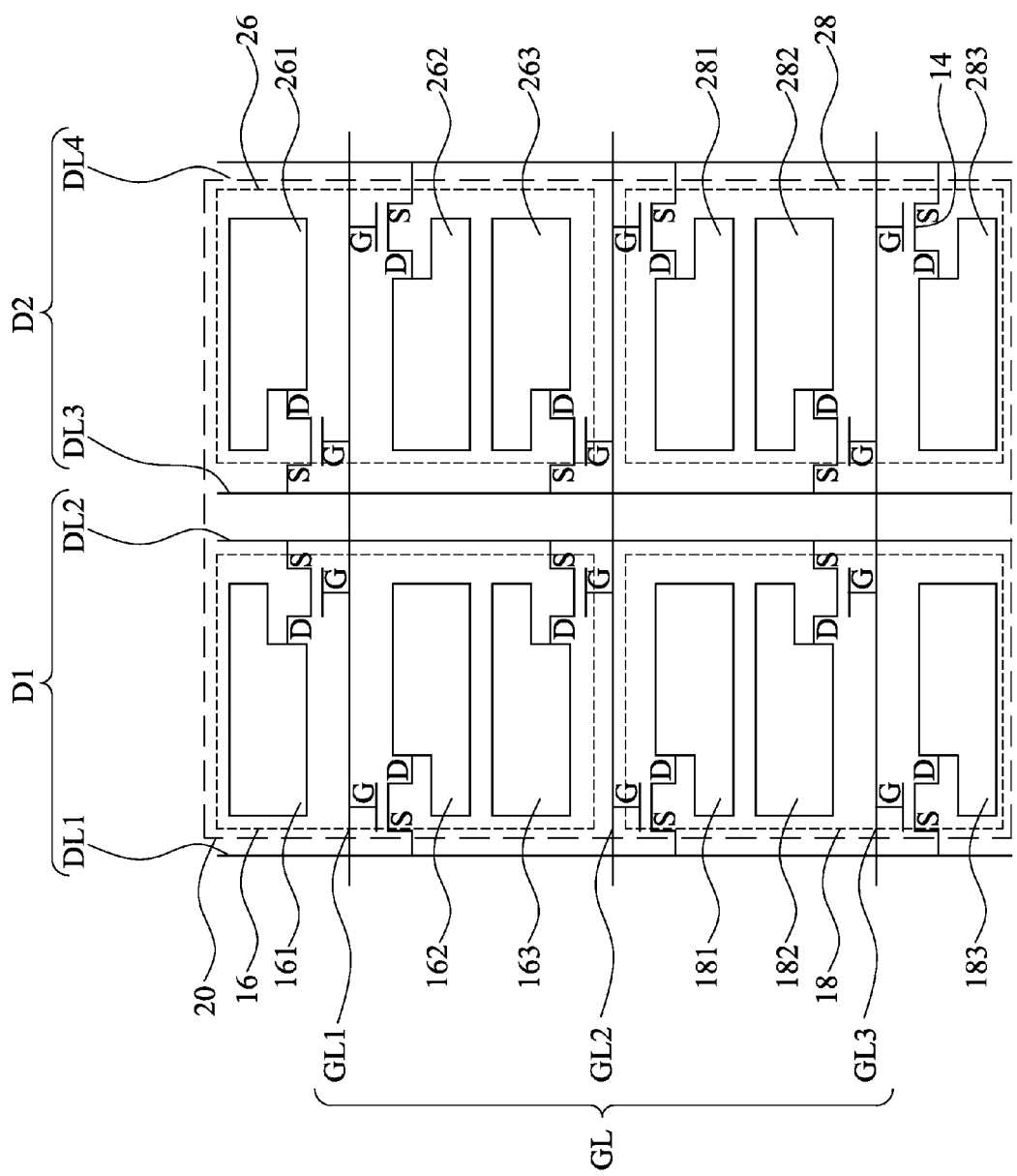
FIG. 6A illustrates a top-view of a part of another embodiment of the pixel layout of the array substrate of the present disclosure.
Figure 6B:
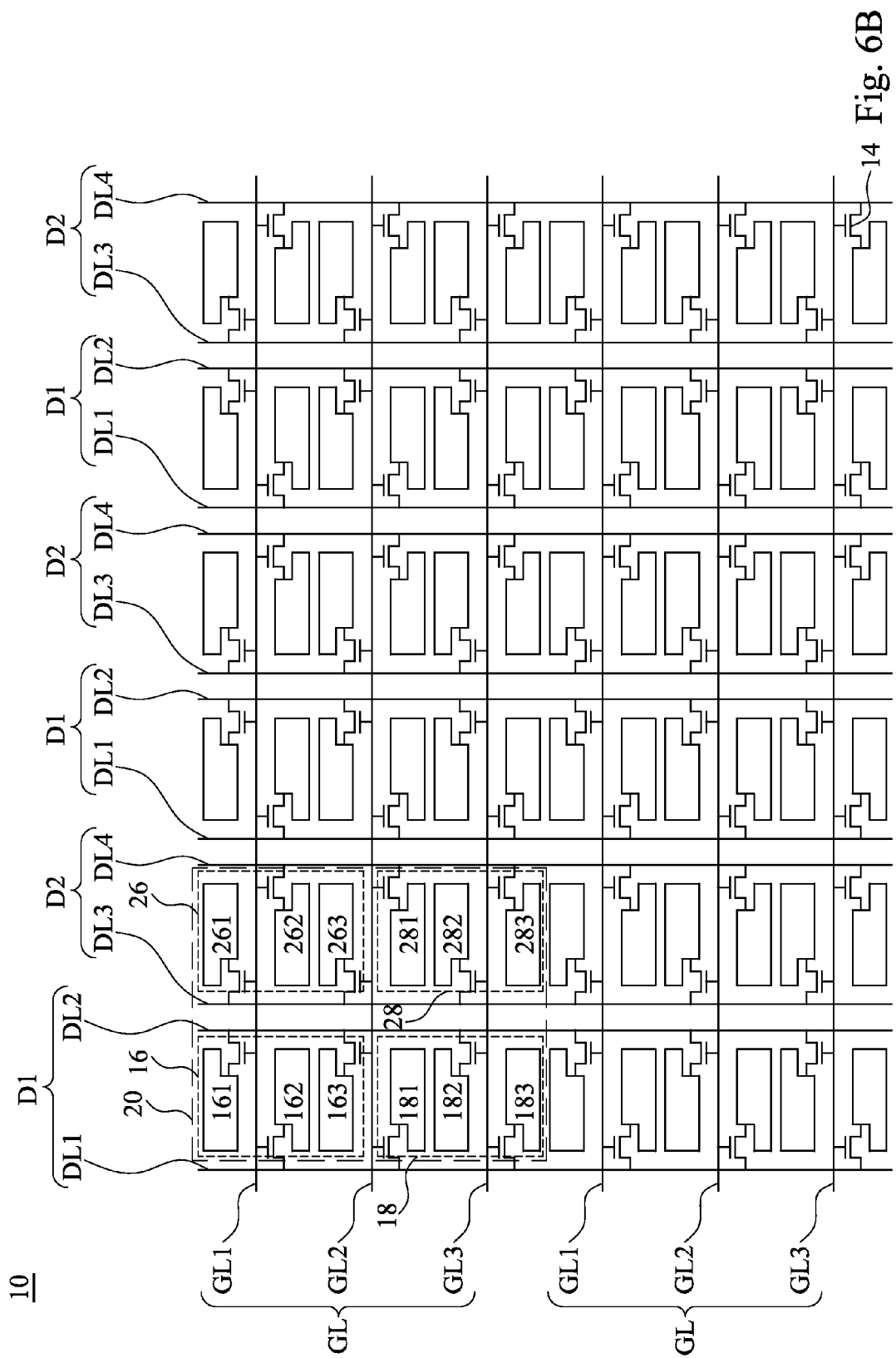
FIG. 6B illustrates a top-view of a part of another embodiment of the pixel layout of the array substrate of the present disclosure.
Figure 7:
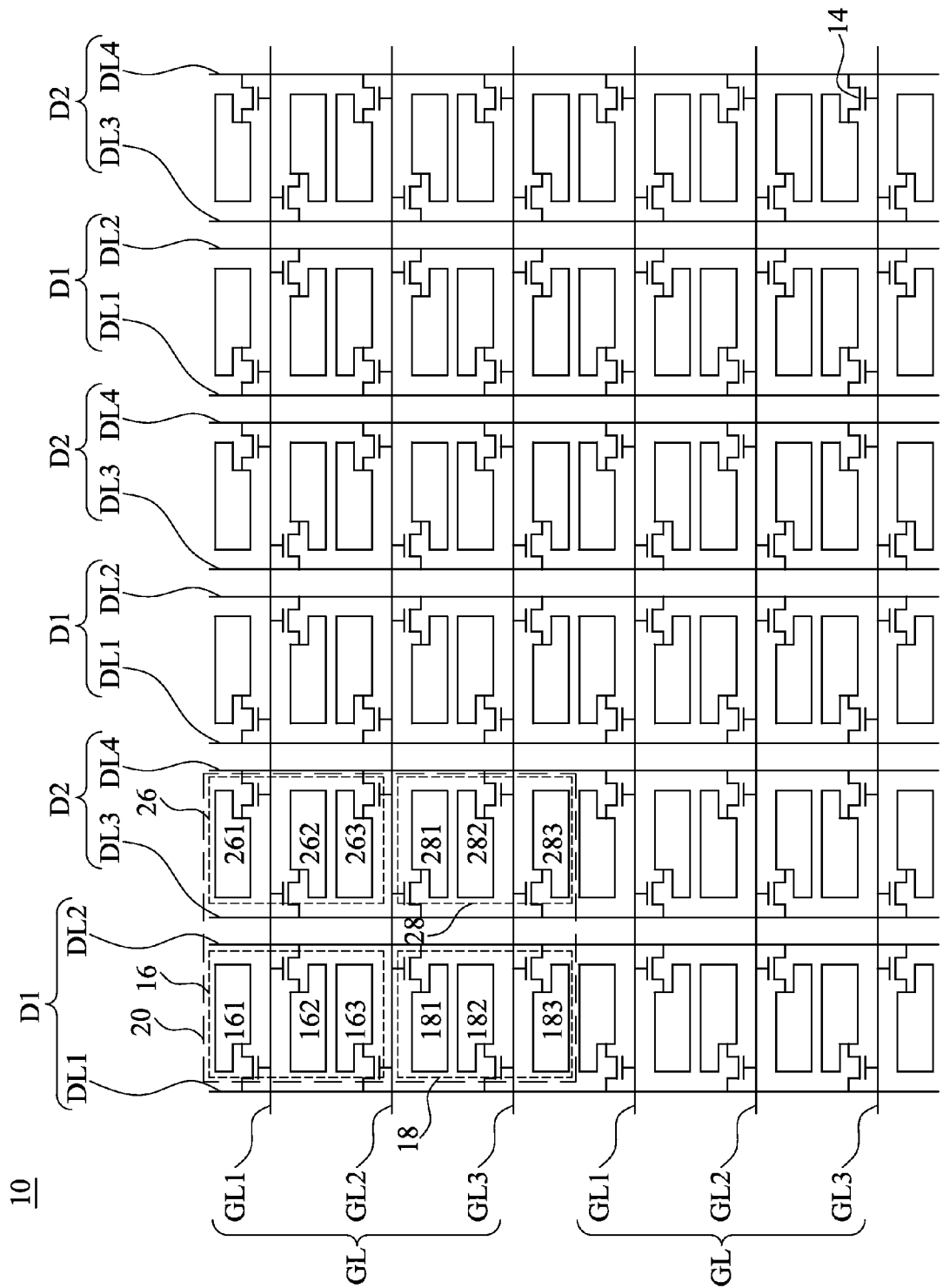
FIG. 7 illustrates a top-view of a part of another embodiment of the pixel layout of the array substrate of the present disclosure.

FIG. 6A and FIG. 6B are both top-view of a part of another embodiment of the pixel layout of the array substrate of the present disclosure. FIG. 6A illustrates an enlarged view of the part of the pixel layout of the array substrate shown in FIG. 6B, and FIG. 6B is composed of a repeating unit, FIG. 6A. That is, six repeating units (FIG. 6A) are shown in six columns of the array substrate in FIG. 6B. Each column has two repeating units (FIG. 1A). To describe and illustrate clearly, labels of each element are only labeled in the repeating unit at the upper left corner of FIG. 6B and following FIG. 7-9. Besides, time of repeating of the repeating unit (FIG. 6A) depends on each design of each following illustration. Referring to FIG. 6B, the array substrate 10 comprises a plurality of sub-pixel groups 20, a plurality of switches 14, a pair of first data lines D1 (composed by DL1 and DL2), a pair of second data lines D2 (composed by DL3 and DL4), and a plurality of scan lines GL1, GL2, GL3.

Referring to FIG. 6A, each sub-pixel group 20 of aforementioned array substrate 10 at least comprises a first sub-pixel group 16, a second sub-pixel group 18, a third sub-pixel group 26, and a fourth sub-pixel group 28, wherein the first sub-pixel group 16 has a first sub-pixel 161, a second sub-pixel 162, and a third sub-pixel 163; the second sub-pixel group 18 has a first sub-pixel 181, a second sub-pixel 182, and a third sub-pixel 183; the third sub-pixel group 26 has a first sub-pixel 261, a second sub-pixel 262, and a third sub-pixel 263; the fourth sub-pixel group 28 has a first sub-pixel 281, a second sub-pixel 282, and a third sub-pixel 283. The first sub-pixel 161, the second sub-pixel 162, and the third sub-pixel 163 of the first sub-pixel group 16, and the first sub-pixel 181, the second sub-pixel 182, and the third sub-pixel 183 of the second sub-pixel group 18 are all disposed in a first column (in the same first column); and the first sub-pixel 261, the second sub-pixel 262, and the third sub-pixel 263 of the third sub-pixel group 26, and the first sub-pixel 281, the second sub-pixel 282, and the third sub-pixel 283 of the fourth sub-pixel group 28 are all disposed in a second column (in the same second column).

Referring to FIG. 6A, a switch 14 is disposed in each of the sub-pixel respectively. The voltages of each of the sub-pixel are controlled by turning on (or namely enabling) or turning off (or namely disabling) its corresponding switch 14 respectively. The composition of switch 14 and its connection to the scan line, the data line, and the sub-pixels are described above. Wherein each switch 14 of each sub-pixel of the first sub-pixel group 16 and the second sub-pixel group 18 is electrically connected to the pair of first data lines D1 (DL1 and DL2). The pair of first data lines D1 (DL1 and DL2) can be disposed in two sides of the first sub-pixel group 16 and the second sub-pixel group 18 preferably, that is, the first sub-pixel group 16 and the second sub-pixel group 18 are disposed in the first column which is defined by the pair of first data lines D1 (DL1 and DL2) as shown in FIG. 6A, but not limited to it. In other embodiments of the present disclosure, DL1 and DL2 can be disposed in the same side of the first sub-pixel group 16 and the second sub-pixel group 18. Therefore, the first sub-pixel group 16 and the second sub-pixel group 18 are arranged along with the extending direction of the pair of first data lines D1 (DL1 and DL2). The connection of the switch 14 of each sub-pixel the first sub-pixel group 16 and the second sub-pixel group 18 and the pair of first data lines D1 (DL1 and DL2) is similar to that shown in FIG. 1A. The data line DL1 of the pair of first data lines D1 is connected to the switches 14 of the second sub-pixel 162 of the first sub-pixel group 16, the first sub-pixel 181 of the second sub-pixel group 18, third sub-pixel 183 of the second sub-pixel group 18, while DL2 of the pair of first data lines D1 is connected to the switches 14 of the first sub-pixel 161 of the first sub-pixel group 16, the third sub-pixel 163 of the first sub-pixel group 16, and the second sub-pixel 182 of the second sub-pixel group 18, but not limited to it. Specifically, each switch 14 of each sub-pixel in the first column is connected to the pair of first data lines D1 (DL1, DL2) in a zigzag manner. In FIG. 6A, for example, the data line of the pair of first data lines D1 connected to the first, second, third sub-pixels of the first sub-pixel group 16 in the first column, and the first, second, third sub-pixels of the second sub-pixel group 18 in the first column is DL2, DL1, DL2, DL1, DL2, DL1 in order (from top to bottom), but the connection is not limited to it. In the connecting relation of aforementioned switches 14 and the pair of first data lines D1, such as data line DL1 and data line DL2 are exchangeable, for example, the data line of the pair of data lines D1 connected to the first, second, third sub-pixels of the first sub-pixel group 16 in the first column, and the first, second, third sub-pixels of the second sub-pixel group 18 in the first column can also be DL1, DL2, DL1, DL2, DL1, DL2 in order (from top to bottom).

Referring to FIG. 6A, each switch 14 of each sub-pixel of the third sub-pixel group 26 and the fourth sub-pixel group 28 is electrically connected to the pair of second data lines D2 (DL3 and DL4). The pair of second data lines D2 (DL3 and DL4) can be disposed in two sides of the third sub-pixel group 26 and the fourth sub-pixel group 28 preferably, that is, the third sub-pixel group 26 and the fourth sub-pixel group 28 are disposed in the second column which is defined by the pair of second data lines D2 (DL3 and DL4) as shown in FIG. 6A, but not limited to it. Wherein, the second column and the first column is different each other. In other embodiments of the present disclosure, DL1 and DL2 can be disposed in the same side of the third sub-pixel group 26 and the fourth sub-pixel group 28. Therefore, the third sub-pixel group 26 and the fourth sub-pixel group 28 are arranged along with the extending direction of the pair of second data lines DL3 and DL4. It should be noticed that, the connecting relation between each switch 14 in the second column and the pair of second data lines D2 (DL3, DL4) is mirror symmetry to those between each switch 14 in the first column and the pair of first data lines D1 (DL1, DL2) based on the boundary of the first column and the second column. More specifically, the connection of the switch 14 of each sub-pixel the first sub-pixel group 16 and the second sub-pixel group 18 in the first column is that DL1 of the pair of first data lines D1 is connected to the switches 14 of the second sub-pixel 162 of the first sub-pixel group 16, the first sub-pixel 181 of the second sub-pixel group 18, third sub-pixel 183 of the second sub-pixel group 18; DL2 of the pair of first data lines D1 is connected to the switches 14 of the first sub-pixel 161 of the first sub-pixel group 16, the third sub-pixel 163 of the first sub-pixel group 16, and the second sub-pixel 182 of the second sub-pixel group 18, while the connecting relation of the switch 14 of each sub-pixel the third sub-pixel group 26 and the fourth sub-pixel group 28 in the second column is that DL3 of the pair of second data lines D2 is connected to the switches 14 of the first sub-pixel 261 of the third sub-pixel group 26, the third sub-pixel 263 of the third sub-pixel group 26, and the second sub-pixel 282 of the fourth sub-pixel group 28; DL4 of the pair of second data lines D2 is connected to the switches 14 of the second sub-pixel 262 of the third sub-pixel group 26, the first sub-pixel 281 of the fourth sub-pixel group 28, the third sub-pixel 283 of the fourth sub-pixel group 28.

Specifically, each switch 14 of each sub-pixel in the first column is connected to the pair of first data lines D1 (DL1, DL2) in a zigzag manner; and each switch 14 of each sub-pixel in the second column is connected to the pair of second data lines D2 (DL1, DL2) in the other zigzag manner. These two zigzag manners are also in a staggered relationship to each other, and mirror symmetry by the symmetry axis (the boundary between the first column and the second column) is formed. In FIG. 6A, for example, the data line of the pair of first data lines D1 connected to the first, second, third sub-pixels of the first sub-pixel group 16 in the first column, and the first, second, third sub-pixels of the second sub-pixel group 18 in the first column is DL2, DL1, DL2, DL1, DL2, DL1 in order (from top to bottom) while the data line of the pair of second data lines D2 connected to the first, second, third sub-pixels of the third sub-pixel group 26 in the second column, and the first, second, third sub-pixels of the fourth sub-pixel group 28 in the second column is DL3, DL4, DL3, DL4, DL3, DL4 in order (from top to bottom), but not limited to it. In the connection of aforementioned switches 14 and the pair of first data lines D1, data line D1 and data line D2 are exchangeable. However, if data line D1 and data line D2 are exchanged, data line D3 and data line D4 must be also exchanged. For example, if the data line of the pair of first data lines D1 connected to the first, second, third sub-pixels of the first sub-pixel group 16 in the first column, and the first, second, third sub-pixels of the second sub-pixel group 18 in the first column is exchanged to be DL1, DL2, DL1, DL2, DL1, DL2 in order (from top to bottom), the data line of the pair of second data lines D2 connected to the first, second, third sub-pixels of the first sub-pixel group 16 in the first column, and the first, second, third sub-pixels of the second sub-pixel group 18 in the first column must be exchanged to be DL4, DL3, DL4, DL3, DL4, DL3 in order (from top to bottom) correspondingly.

Referring to FIG. 6A and FIG. 6B together, the array substrate 10 of the present embodiment at least comprises a first scan line GL1, a second scan line GL2, and a third scan line GL3. All scan lines of the set of scan line GL are crossed to (or namely interlaced to) the pair of first data lines D1 (DL1, DL2) and the pair of second data lines D2 (DL3, DL4). Wherein each gate electrode G of each switch 14 of the first sub-pixel 161 of the first sub-pixel group 16, the second sub-pixel 162 of the first sub-pixel group 16, the first sub-pixel 261 of the third sub-pixel group 26, and the second sub-pixel 262 of the third sub-pixel group 26 is connected to the first scan line GL1; each gate electrode G of each switch 14 of the third sub-pixel 163 of the first sub-pixel group 16, the first sub-pixel 181 of the second sub-pixel group 18, the third sub-pixel 263 of the third sub-pixel group 26, the first sub-pixel 281 of the fourth sub-pixel group 28 is connected to the second scan line GL2; each gate electrode G of each switch 14 of the second sub-pixel 182 of the second sub-pixel group 18, the third sub-pixel 183 of the second sub-pixel group 18, the second sub-pixel 282 of the fourth sub-pixel group 28, and the third sub-pixel 283 of the fourth sub-pixel group 28 is connected to the third scan line GL3. More specifically, each scan line GL1, GL2, and GL3 is respectively connected to each switch of two adjacent sub-pixels which are in the same column but different rows. As shown in FIG. 6A, the sub-pixel group 20 has the first sub-pixel group 16 and the second sub-pixel group 18 in the first column, the third sub-pixel group 26 and the fourth sub-pixel group 28 second column, and are corresponded to twelve switches 14 totally. These twelve switches 14 disposed respectively in twelve sub-pixels (161, 162, 163, 181, 182, 183, 261, 262, 263, 281, 282, 283) are distributed evenly to three scan lines (GL1, GL2, GL3). That is, GL1 is connected to the gate electrodes G of the switches of sub-pixel 161, 162, 261 and 262; GL2 is connected to the gate electrodes G of the switches of sub-pixel 163, 181, 263 and 281; GL3 is connected to the gate electrodes G of the switches of sub-pixel 182, 183, 282 and 283.

Besides, three primary color of light disposed in three different columns respectively is the example as describing the present embodiment. FIG. 6B is top-view of part of one embodiment of the pixel layout of the array substrate of the present disclosure. As shown in FIG. 6B, the sub-pixel groups of the first, fourth columns (counted from left to right) display a first colored light; the sub-pixel groups of the second, fifth columns (counted from left to right) display a second colored light; the sub-pixel groups of the third, sixth columns (counted from left to right) display a third colored light, wherein the first colored light could be red light, the second colored light could be green light, and the third colored light could be blue light, but not limited to it. That is, the first, second and third colored light are exchangeable, as long as the combination of them includes three primary color of light (red, green, and blue), the display panel of the present disclosure is capable to display all kinds of predetermined color. In addition, the array substrate of the present disclosure is also as aforementioned embodiments, consisting two different colors in two different columns respectively, or consisting four, five, six different colors in four, five, six different columns respectively. That is, the array substrate of the present disclosure can also comprises two, three, four, five, six different sub-pixel groups with different colors in different columns respectively, and the colors of each sub-pixel of the sub-pixel group in the same column are substantially the same.

Referring to FIG. 6B, the driving method of the array substrate of another embodiment of the present disclosure is to offering a plurality of voltages to the pair of first data lines D1 (DL1, DL2) and the pair of second data lines D2 (DL3, DL4) in a plurality of time sequences. Specifically, in the present embodiment, the pair of first data lines D1 (DL1, DL2) and the pair of second data lines D2 (DL3, DL4) are offered three different voltages in three different time sequences (or namely three different time clock) respectively. The three different voltages offered to the pair of second data lines D2 (DL3, DL4) could be the same with or different from the three different voltages offered to the pair of first data lines D1 (DL1, DL2). To describe clearly, the three different voltages offered to the pair of second data lines D2 (DL3, DL4) are the same with the three corresponding voltages offered to the pair of first data lines D1 (DL1, DL2) as an example, and the present embodiment is described as shown in FIG. 6B. In the first time sequence, data line DL1 is offered a second voltage to supply the voltage which is predetermined for the second sub-pixel 162 of the first sub-pixel group 16, data line DL2 is offered a first voltage to supply the voltage which is predetermined for the first sub-pixel 161 of the first sub-pixel group 16, data line DL3 is offered a first voltage to supply the voltage which is predetermined for the first sub-pixel 261 of the third sub-pixel group 26, and data line DL4 is offered a second voltage to supply the voltage which is predetermined for the second sub-pixel 262 of the third sub-pixel group 26; in the second time sequence, data line DL1 is changed to be offered a first voltage to supply the voltage which is predetermined for the first sub-pixel 181 of the second sub-pixel group 18, data line DL2 is changed to be offered a third voltage to supply the voltage which is predetermined for the third sub-pixel 163 of the first sub-pixel group 16, data line DL3 is changed to be offered the third voltage to supply the voltage which is predetermined for the third sub-pixel 263 of the third sub-pixel group 26, data line DL4 is changed to be offered the first voltage to supply the voltage which is predetermined for the first sub-pixel 281 of the fourth sub-pixel group 28; in the third time sequence, data line DL1 is changed to be offered a third voltage to supply the voltage which is predetermined for the third sub-pixel 183 of the second sub-pixel group 18, data line DL2 is changed to be offered the second voltage to supply the voltage which is predetermined for the second sub-pixel 182 of the second sub-pixel group 18, data line DL3 is changed to be offered the second voltage to supply the voltage which is predetermined for the second sub-pixel 282 of the fourth sub-pixel group 28, and data line DL4 is changed to be offered the third voltage to supply the voltage which is predetermined for the third sub-pixel 283 of the fourth sub-pixel group 28. To be more specific, the voltages offered to data line DL1 is changeable to supply the second, first, and third voltages in the first, second, and third time sequences respectively; the voltages offered to data line DL2 is changeable to supply the first, third, and second voltages in the first, second, and third time sequences respectively; the voltages offered to data line DL3 is changeable to supply the first, third, and second voltages in the first, second, and third time sequences respectively; and the voltages offered to data line DL4 is changeable to supply the second, first, and third voltages in the first, second, and third time sequences respectively. Accordingly, the voltages supplied by data line DL1, DL2 in different time sequence are different from each other, and the voltages supplied by data line DL3, DL4 in different time sequence are also different from each other. In the first, second, and third time sequences, the predetermined voltages for the first, second, and third sub-pixel of the first sub-pixel group 16 and the second sub-pixel group 18 of the sub-pixel group 20 are fully charged respectively by the second, first, and third voltage supplied by data line DL1 and the first, third, and second voltage supplied by data line DL2; and the predetermined voltages for the first, second, and third sub-pixel of the third sub-pixel group 26 and the fourth sub-pixel group 28 of the sub-pixel group 20 are fully charged respectively by the first, third, and second voltage supplied by data line DL3 and the second, first, and third voltage supplied by data line DL4. It should be noticed that each sub-pixel of the first sub-pixel group 16 and the second sub-pixel group 18, the third sub-pixel group 26 and the fourth sub-pixel group 28 in two adjacent rows are fully charged to having their predetermined voltages respectively then the predetermined image of them is shown while the first, second, and third time sequences are all completed. Therefore, the first, second, and third time sequences are all respectively a part of time of a frame which the frame. Referring to FIG. 6B, when the scan lines GL1, GL2, and GL3 are turned on in aforementioned the first, second, and third time sequences respectively, each the first, second, and third sub-pixel of the first, second, third, and fourth sub-pixel group is charged to have a voltage above the threshold voltage thereof respectively by switching three kinds of voltages of the data lines, DL1, DL2, DL3, and DL4. The threshold voltage is the minimum voltage which forces the liquid crystal molecules in each sub-pixel to rotate and to start having optical transmittance. When a sub-pixel substantially has a voltage substantially greater than its threshold voltage, the higher the voltage is, the greater the optical transmittance of the sub-pixel is. The voltage is proportional to the optical transmittance until the optical transmittance of the sub-pixel reaches its maximum, and the voltage of it is called the saturated voltage. It should be noticed that the first voltage, the second voltage, and the third voltage are different from each other. When the array substrate of the display panel of one embodiment of the present disclosure is in its 2D mode, the first, second, and the third sub-pixel of the first sub-pixel group and the second sub-pixel group are having different voltages respectively. That is, the voltages of the first sub-pixel 161, the second sub-pixel 162, and the third sub-pixel 163 in first sub-pixel group 16 are different from each other; and the voltages of the first sub-pixel 181, the second sub-pixel 182, and the third sub-pixel 183 in second sub-pixel group 18 are different from each other; the voltages of the first sub-pixel 261, the second sub-pixel 262, and the third sub-pixel 263 in third sub-pixel group 26 are different from each other; the voltages of the first sub-pixel 281, the second sub-pixel 282, and the third sub-pixel 283 in fourth sub-pixel group 28 are also different from each other. The first voltage, the second voltage, and the third voltage are all substantially greater than the threshold voltages of each sub-pixel. To be more specific, each sub-pixel of each sub-pixel group has a voltage which is substantially greater than its threshold voltage, and therefore each sub-pixel has an optical transmittance. The sub-pixels have different voltages, and the degrees of their optical transmittance are also different. It results in that the sub-pixels display different intensity of light from each other.

Referring to FIG. 6B, furthermore, in one embodiment of the present disclosure, when the array substrate of the display panel is in 2D mode, except all sub-pixels of all sub-pixel groups have voltages above (or namely substantially greater than) their threshold voltages, the first voltage is substantially greater than the second voltage, and the second voltage is substantially greater than the third voltages. Therefore, when the array substrate of the display panel of the present disclosure is in 2D mode, the voltages of the first sub-pixel (161, 181, 261, 281) are substantially greater than those of the second sub-pixel (162, 182, 262, 282) and the voltages of the second sub-pixel (162, 182, 262, 282) are substantially greater than those of the third sub-pixel (163, 183, 263, 283). Therefore, all sub-pixels of the display panel have different optical transmittances. In each sub-pixel group, the brightness of the first sub-pixel is the highest, that of the second sub-pixel is secondary, and that of the third sub-pixel is the lowest. When aforementioned sub-pixel groups are all enabled, all sub-pixels of the first sub-pixel group 16 display the same color of light; all sub-pixels of the second sub-pixel group 18 display the same color of light; all sub-pixels of the third sub-pixel group 26 display the same color of light; and all sub-pixels of the fourth sub-pixel group 28 display the same color of light. Preferably, the first sub-pixel group 16 and the second sub-pixel group 18 display substantially the same color of light, and the third sub-pixel group 26 and the fourth sub-pixel group 28 display substantially the same color of light.

Figure 8:
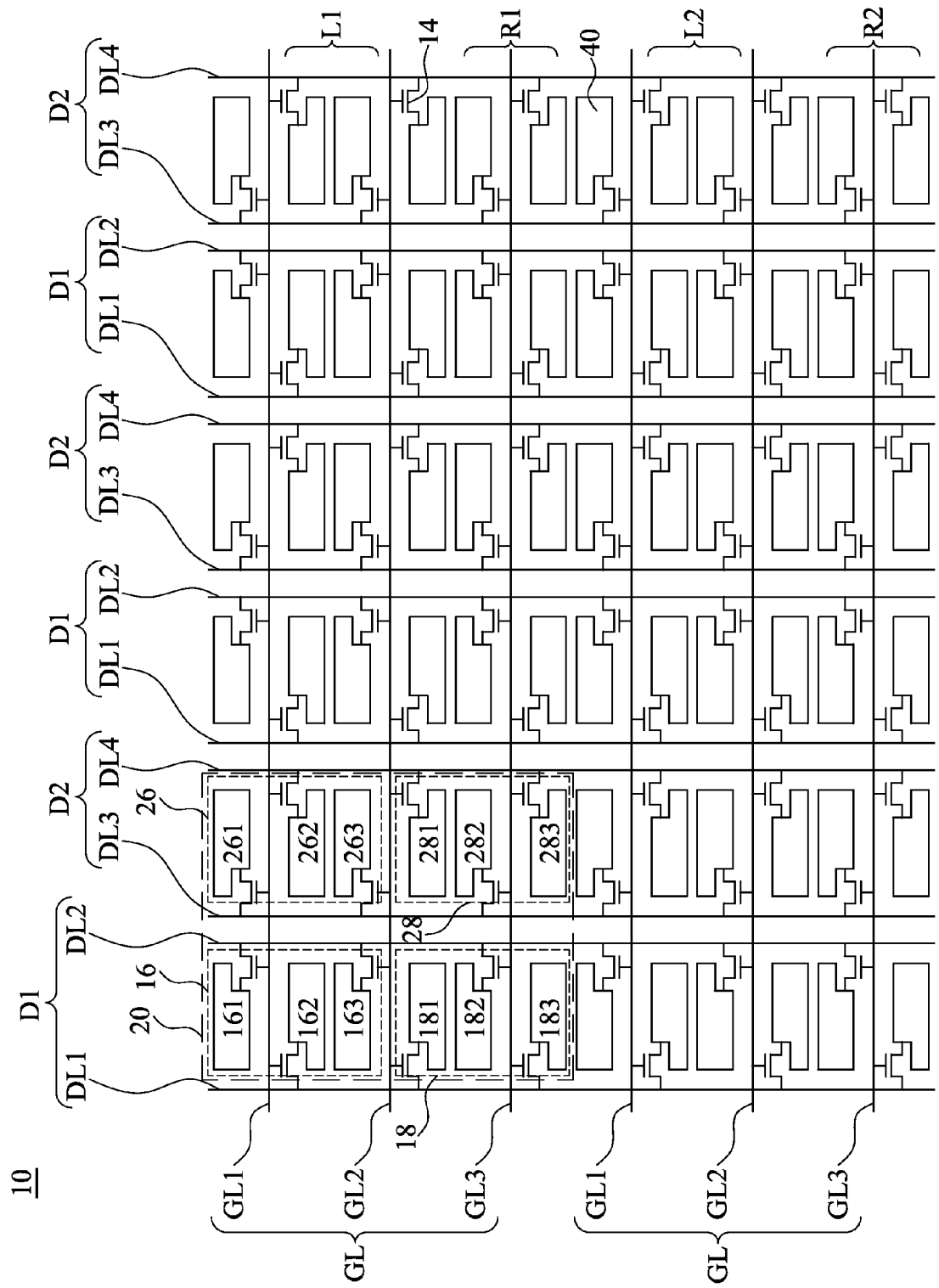
FIG. 8 illustrates a top-view of a part of another embodiment of the pixel layout of the array substrate of the present disclosure.

Referring to FIG. 8, in another embodiment of the present disclosure, when the array substrate of the display panel is in 3D mode, there are black regions (or namely light shading region) 40 between the sub-pixels for left eye and right eye of the observer to separate the images displayed, and to avoid the issue of cross-talk. The issue of cross-talk occurs when the right eye observes the wrong images, which are predetermined for the left eye, vice versa. As shown in FIG. 8, when the array substrate 10 of the display panel is in 3D display mode, just allow the first voltage offered by the pair of first data lines D1 (DL1, DL2) and the pair of second data lines D2 (DL3, DL4) in each time sequence substantially to be less than the threshold voltages of the first sub-pixels of each sub-pixel group according to aforementioned driving method. So as the first sub-pixels 161, 181, 261, 281 are not enabled (or namely disabled) in each time sequence and become the black regions 40 respectively. Meanwhile, the second voltage is still substantially greater than the threshold voltages of the second sub-pixels 162, 182, 262, 282 and the third voltage is still substantially greater than the threshold voltages of the third sub-pixels 163, 183, 263, 283. That is, the second sub-pixels (162, 182, 262, 282) and the third sub-pixels (163, 183, 263, 283) are enabled and having optical transmittances. Referring to FIG. 8, the second sub-pixel 162 of the first sub-pixel group 16, the third sub-pixel 163 of the first sub-pixel group 16, the second sub-pixel 262 of the third sub-pixel group 26, and the third sub-pixel 263 of the third sub-pixel group 26 offer the display images (L1, L2) for left eye of observers, and the second sub-pixel 182 of the second sub-pixel group 18, the third sub-pixel 183 of the second sub-pixel group 18, the second sub-pixel 282 of the fourth sub-pixel group 28, and the third sub-pixel 283 of the fourth sub-pixel group 28 offer the display images (R1, R2) for right eye of observers. The first sub-pixel 161 of the first sub-pixel group 16, the first sub-pixel 181 of the second sub-pixel group 18, the first sub-pixel 261 of the third sub-pixel group 26, and the first sub-pixel 281 of the fourth sub-pixel group 28 are opaque and become the black regions 40 to separate the images from the sub-pixels which are predetermined to offer the images for right eye and left eye respectively since the first sub-pixel 161 of the first sub-pixel group 16, the first sub-pixel 181 of the second sub-pixel group 18, the first sub-pixel 261 of the third sub-pixel group 26, and the first sub-pixel 281 of the fourth sub-pixel group 28 are having voltages which are substantially lower than their threshold voltages. So the issue of cross-talk is avoided and the display quality in 3D mode of the array substrate of the display panel of the present disclosure is improved.

Figure 9:
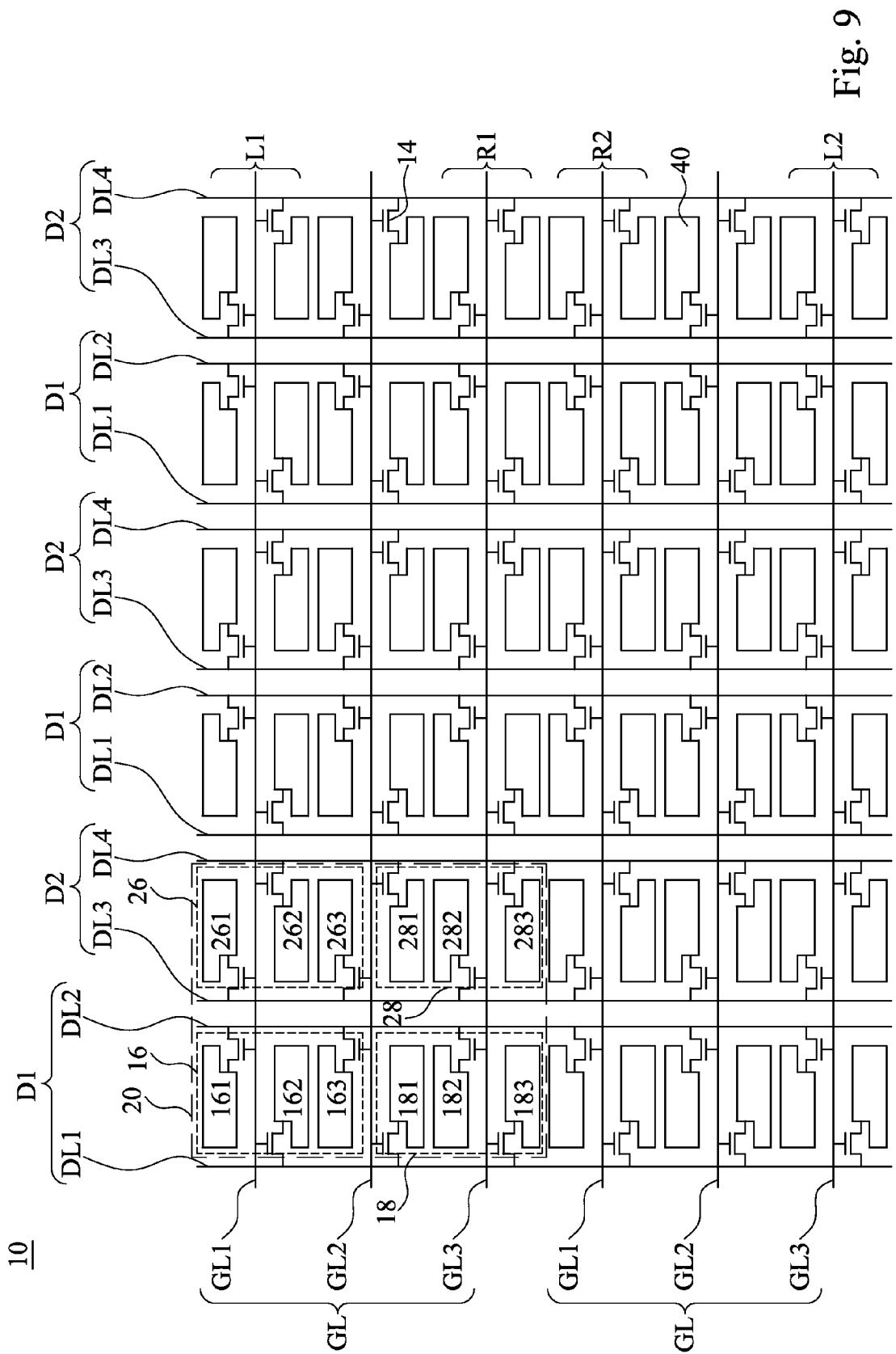
FIG. 9 illustrates a top-view of a part of another embodiment of the pixel layout of the array substrate of the present disclosure.

Referring to FIG. 9, in one embodiment of the present disclosure, the array substrate of the display panel has wider blackout areas 40 to avoid aforementioned issue of cross-talk which could happened in 3D mode observed by wider view angles. As shown in FIG. 9, when the array substrate 10 of the display panel is in 3D display mode, just allow the third voltage and the first voltage offered by the pair of first data lines D1 (DL1, DL2) and the pair of second data lines D2 (DL3, DL4) in the second time sequence substantially to be less than the threshold voltages of the third sub-pixel 163 of the first sub-pixel group 16, the first sub-pixel 181 of the second sub-pixel group 18, the third sub-pixel 263 of the third sub-pixel group 26, and the first sub-pixel 281 of the fourth sub-pixel group 28 according to aforementioned driving method. So as the third sub-pixel 163 of the first sub-pixel group 16, the first sub-pixel 181 of the second sub-pixel group 18, the third sub-pixel 263 of the third sub-pixel group 26, and the first sub-pixel 281 of the fourth sub-pixel group 28 are not enabled in each time sequence (since the second time sequence is the only chance for them to be charged) and become the black regions 40 respectively. Meanwhile, the second voltage and the first voltage offered by the pair of first data lines D1 (DL1, DL2) and the pair of second data lines D2 (DL3, DL4) in the first time sequence are substantially greater than the threshold voltages of the second sub-pixel 162 of the first sub-pixel group 16, the first sub-pixel 161 of the first sub-pixel group 16, the second sub-pixel 262 of the third sub-pixel group 26, the first sub-pixel 261 of the third sub-pixel group 26; the third voltage and the second voltage offered by the pair of first data lines D1 (DL1, DL2) and the pair of second data lines D2 (DL3, DL4) in the third time sequence are substantially greater than the threshold voltages of the third sub-pixel 183 of the second sub-pixel group 18, the second sub-pixel 182 of the second sub-pixel group 18, the third sub-pixel 283 of the fourth sub-pixel group 28, and the second sub-pixel 282 of the fourth sub-pixel group 28. As shown in FIG. 9, the first sub-pixel 161 of the first sub-pixel group 16, the second sub-pixel 162 of the first sub-pixel group 16, the first sub-pixel 261 of the third sub-pixel group 26, and the second sub-pixel 262 of the third sub-pixel group 26 display the images L1 which is predetermined for left eye of the observer. The second sub-pixel 182 of the second sub-pixel group 18, the third sub-pixel 183 of the second sub-pixel group 18, the second sub-pixel 282 of the second sub-pixel group 28, and the third sub-pixel 283 of the second sub-pixel group 28 display the images R1 which is predetermined for right eye of the observer. The third sub-pixel 163 of the first sub-pixel group 16, the first sub-pixel 181 of the second sub-pixel group 18, the third sub-pixel 263 of the third sub-pixel group 26, and the first sub-pixel 281 of the fourth sub-pixel group 28 are opaque as black regions 40 because of having the voltages which are substantially less than their threshold voltages respectively. Accordingly, the embodiment of the present disclosure shown in FIG. 9 has wider black regions 40 than those of the embodiment of the present disclosure shown in FIG. 8. That is, the issue of cross-talk can be avoid even when the array substrate of the display panel is in 3D mode and being observed in wider view angles. Therefore, a better quality of 3D images can be achieved.

It should be noticed that the array substrate of the display panel of the present disclosure has a whole new design of pixel layout. The masks for 2D display mode are also the masks for 3D display mode of the display panel so as to reduce the cost of manufacturing. Furthermore, the color washout issue of 3D display mode in wider viewing angle is also improved by independently controlling each sub-pixels of the array substrate with the whole new design of pixel layout.

Although the present disclosure has been described in considerable detail with reference to certain embodiments thereof, other embodiments are possible. Therefore, the spirit and scope of the appended claims should not be limited to the description of the embodiments contained herein.

It will be apparent to those ordinarily skilled in the art that various modifications and variations may be made to the structure of the present disclosure without departing from the scope or spirit of the disclosure. In view of the foregoing, it is intended that the present disclosure cover modifications and variations thereof provided they fall within the scope of the following claims.

The invention claimed is:

1. An array substrate of a display panel, comprising:
    a plurality of sub-pixel groups, at least comprising a first sub-pixel group and a second sub-pixel group, the first sub-pixel group and the second sub-pixel group individually at least having a first sub-pixel, a second sub-pixel, and a third sub-pixel, the first sub-pixel group and the second sub-pixel group being disposed in a first column, wherein the first sub-pixel, the second sub-pixel, and the third sub-pixel of the first sub-pixel group are arranged sequentially in a predetermined direction from top to bottom and the first sub-pixel, the second sub-pixel, and the third sub-pixel of the second sub-pixel group are arranged sequentially in the predetermined direction;
    a plurality of switches individually disposed in the first, second and third sub-pixel of the first sub-pixel group and the second sub-pixel group;
    a pair of first data lines disposed in at least one side of the first sub-pixel group and the second sub-pixel group, wherein the respective switches of the first sub-pixel and the third sub-pixel of the first sub-pixel group and the switch of the second sub-pixel of the second sub-pixel group are individually connected to one data line of the pair of first data lines, and the switch of the second sub-pixel of the first sub-pixel group and the respective switches of the first sub-pixel and the third sub-pixel of the second sub-pixel group are individually connected to the other data line of the pair of first data lines; and a plurality of scan lines comprising at least a first, second and third scan line which are interlaced to the pair of first data lines, wherein the switches of the first sub-pixel and the second sub-pixel of the first sub-pixel group are individually connected to the first scan line, the switches of the third sub-pixel of the first sub-pixel group and the first sub-pixel of the second sub-pixel group are individually connected to the second scan line, and the switches of the second sub-pixel and the third sub-pixel of the second sub-pixel group are individually connected to the third scan line, wherein the first sub-pixels of the first and second sub-pixel groups are disabled, and the second and third sub-pixels of the first and second sub-pixel group are enabled in 3D display mode of the array substrate, wherein the second and third sub-pixel of the first sub-pixel group provide a display image of left eye and the second and the third sub-pixel of the second sub-pixel group provide a display image of right eye.

2. The array substrate of claim 1, wherein the plurality of sub-pixel groups further comprises a third sub-pixel group and a fourth sub-pixel group, the respective third sub-pixel group and the fourth sub-pixel group at least having a first sub-pixel, a second sub-pixel, and a third sub-pixel, the third sub-pixel group and the fourth sub-pixel group being disposed in a second column, the first and the third sub-pixel groups being arranged in a first row, the second and the fourth sub-pixel groups being arranged in a second row; and the plurality of switches further comprises switches individually disposed in the first, second and third sub-pixel of the third and fourth sub-pixel group, wherein the switches of the first and second sub-pixel of the third sub-pixel group are connected to the first scan line, the switches of the third sub-pixel of the third sub-pixel group and the first sub-pixel of the fourth sub-pixel group are connected to the second scan line, and the switches of the second and third sub-pixel of the fourth sub-pixel group are connected to the third scan line.

3. The array substrate of claim 2, further comprising:
a pair of second data lines, the pair of second data lines being substantially parallel to the pair of first data lines, and being disposed in at least one side of the third and fourth sub-pixel groups which is interlaced to the first, second and third scan lines, wherein the switches of the first and third sub-pixels of the third sub-pixel group and the switch of the second sub-pixel of the fourth sub-pixel group are connected to one of the pair of second data lines, and the switch of the second sub-pixel of the third sub-pixel group and the switches of the first and third sub-pixels of the fourth sub-pixel group are connected to the other one of the pair of second data lines.

4. The array substrate of claim 3, wherein connection positions of each switch of each sub-pixel of the third and fourth sub-pixel groups and the pair of second data lines are in mirror symmetry to those of each switch of each sub-pixel of the first and second sub-pixel groups and the pair of first data lines, and boundary of the first column and the second column is the symmetry axis.

5. The array substrate of claim 3, wherein the switches of the first and third sub-pixels of the third sub-pixel group and the switch of the second sub-pixel of the fourth sub-pixel group are connected to one data line of the pair of the second data lines, but not connected to the other data line of the pair of second data lines.

6. The array substrate of claim 5, wherein the switch of the second sub-pixel of the third sub-pixel group and the switches of the first and third sub-pixels of the fourth sub-pixel group are connected to the other data line of the pair of second data lines, but not connected to the one data line of the pair of second data lines.

7. The array substrate of claim 2, wherein the voltages of the first sub-pixel of the third and fourth sub-pixel groups are greater than those of the second sub-pixel of the third and fourth sub-pixel groups, and the voltages of the third sub-pixel of the third and fourth sub-pixel groups are less than those of the second sub-pixel of the third and fourth sub-pixel groups.

8. The array substrate of claim 2, wherein the first sub-pixel, the second sub-pixel, and the third sub-pixel of the third sub-pixel group are arranged sequentially in the predetermined direction, the first sub-pixel, the second sub-pixel, and the third sub-pixel of the fourth sub-pixel group are arranged sequentially in the predetermined direction, wherein the first sub-pixels of the third and fourth sub-pixel groups are disabled, and the second and third sub-pixels of the third, fourth sub-pixel groups are enabled in 3D display mode of the array substrate.

9. The array substrate of claim 1, wherein the switches of the first and third sub-pixels of the first sub-pixel group and the switch of the second sub-pixel of the second sub-pixel group are individually connected to one data line of the pair of the first data but not connected to the other data line of the pair of first data lines.

10. The array substrate of claim 9, wherein the switch of the second sub-pixel of the first sub-pixel group and the switches of the first and third sub-pixels of the second sub-pixel group are individually connected to the other data line of the pair of first data but not connected to the one data line of the pair of first data lines.

11. The array substrate of claim 1, wherein the voltages of the first sub-pixel of the first and second sub-pixel groups are greater than those of the second sub-pixel of the first and second sub-pixel groups, and the voltages of the third sub-pixel of the first and second sub-pixel groups are less than those of the second sub-pixel of the first and second sub-pixel groups.

12. A driving method of an array substrate of a display panel, the method comprising:
providing an array substrate comprising:
a plurality of sub-pixel groups, comprising at least a first sub-pixel group and a second sub-pixel group, each of the sub-pixel groups comprising at least a first, second and third sub-pixel, and being disposed in a first column wherein the first sub-pixel, the second sub-pixel, and the third sub-pixel of the first sub-Pixel group arrange sequentially in a predetermined direction and the first sub-pixel, the second sub-pixel, and the third sub-pixel of the second sub-pixel group arrange sequentially in the predetermined direction;
a plurality of switches individually disposed in the first, second, third sub-pixel of the first, second sub-pixel group;
a pair of first data lines disposed in at least one side of the first, second sub-pixel group, wherein the switches of the first, third sub-pixel of the first sub-pixel group and the switch of the second sub-pixel of the second sub-pixel group are connected to one of the pair of first data and the switch of the second sub-pixel of first sub-pixel group and the switches of the first, third sub-pixel of the second sub-pixel group are connected to the other one of the pair of first data lines; and a plurality of scan lines comprising at least a first, second and third scan lines crossed to the pair of first data lines, wherein the switches of the first and second sub-pixels of the first sub-pixel group are connected to the first scan line, the switch of the third sub-pixel of the first sub-pixel group and the switch of the first sub-pixel of the second sub-pixel group are connected to the second scan line, and the switches of the second and third sub-pixels of the second sub-pixel group are connected to the third scan line;

providing a plurality of voltages in a plurality of time sequences to the first data line wherein the plurality of time sequences composes a first time sequence, a second time sequence, and a third time sequence, and the plurality of voltages comprise a first voltage, a second, voltage, and a third voltage; and charging the respective one of the first, second and third sub-pixel of the first and second sub-pixel groups by turning on the plurality of scan lines in each corresponding time sequence wherein the first voltage is less than the enabling voltage of the first sub-pixel of the first, second sub-pixel group; each second voltage is greater than the enabling voltage of the second sub-pixel of the first, second sub-pixel group; and each third voltage is greater than the enabling voltage of the third sub-pixel of the first, second sub-pixel groups in any of the time sequences of 3D mode of the array substrate of the display panel.

13. The driving method of claim 12, wherein the voltage provided to one of the pair of first data lines is different from that provided to the other one of the pair of first data lines in any of the time sequences.

14. The driving method of claim 13, wherein the predetermined direction is from top to bottom or from bottom to top.

15. An array substrate of a display panel, comprising:
a plurality of sub-pixel groups, at least comprising a first sub-pixel group and a second sub-pixel group, the first sub-pixel group and the second sub-pixel group individually at least having a first sub-pixel, a second sub-pixel, and a third sub-pixel, the first sub-pixel group and the second sub-pixel group being disposed in a first column;

a plurality of switches individually disposed in the first, second and third sub-pixel of the first sub-pixel group and the second sub-pixel group;

a pair of first data lines disposed in at least one side of the first sub-pixel group and the second sub-pixel group, wherein the respective switches of the first sub-pixel and the third sub-pixel of the first sub-pixel group and the switch of the second sub-pixel of the second sub-pixel group are individually connected to one data line of the pair of first data lines, and the switch of the second sub-pixel of the first sub-pixel group and the respective switches of the first sub-pixel and the third sub-pixel of the second sub-pixel group are individually connected to the other data line of the pair of first data lines; and a plurality of scan lines comprising at least a first, second and third scan line which are interlaced to the pair of first data lines, wherein the switches of the first sub-pixel and the second sub-pixel of the first sub-pixel group are individually connected to the first scan line, the switches of the third sub-pixel of the first sub-pixel group and the first sub-pixel of the second sub-pixel group are individually connected to the second scan line, and the switches of the second sub-pixel and the third sub-pixel of the second sub-pixel group are individually connected to the third scan line, wherein the third sub-pixel of the first sub-pixel group and the first sub-pixel of the second sub-pixel group are disabled, and the first and second sub-pixels of the first sub-pixel group and the second and third sub-pixels of the second sub-pixel group are enabled in 3D display mode of the array substrate.

16. The array substrate of claim 15, wherein the plurality of sub-pixel groups further comprises a third sub-pixel group and a fourth sub-pixel group, the respective third sub-pixel group and the fourth sub-pixel group at least having a first sub-pixel, a second sub-pixel, and a third sub-pixel, the third sub-pixel group and the fourth sub-pixel group being disposed in a second column, the first and the third sub-pixel groups being arranged in a first row, the second and the fourth sub-pixel groups being arranged in a second row; and the plurality of switches further comprises switches individually disposed in the first, second and third sub-pixel of the third and fourth sub-pixel group, wherein the switches of the first and second sub-pixel of the third sub-pixel group are connected to the first scan line, the switches of the third sub-pixel of the third sub-pixel group and the first sub-pixel of the fourth sub-pixel group are connected to the second scan line, and the switches of the second and third sub-pixel of the fourth sub-pixel group are connected to the third scan line.

17. The array substrate of claim 16, further comprising:
a pair of second data lines, the pair of second data lines being substantially parallel to the pair of first data lines, and being disposed in at least one side of the third and fourth sub-pixel groups which is interlaced to the first, second and third scan lines, wherein the switches of the first and third sub-pixels of the third sub-pixel group and the switch of the second sub-pixel of the fourth sub-pixel group are connected to one of the pair of second data lines, and the switch of the second sub-pixel of the third sub-pixel group and the switches of the first and third sub-pixels of the fourth sub-pixel group are connected to the other one of the pair of second data lines.

18. The array substrate of claim 17, wherein connection positions of each switch of each sub-pixel of the third and fourth sub-pixel groups and the pair of second data lines are in mirror symmetry to those of each switch of each sub-pixel of the first and second sub-pixel groups and the pair of first data lines, and boundary of the first column and the second column is the symmetry axis.

19. The array substrate of claim 17, wherein the switches of the first and third sub-pixels of the third sub-pixel group and the switch of the second sub-pixel of the fourth sub-pixel group are connected to one data line of the pair of the second data lines, but not connected to the other data line of the pair of second data lines.

20. The array substrate of claim 19, wherein the switch of the second sub-pixel of the third sub-pixel group and the switches of the first and third sub-pixels of the fourth sub-pixel group are connected to the other data line of the pair of second data lines, but not connected to the one data line of the pair of second data lines.

21. The array substrate of claim 16, wherein the voltages of the first sub-pixel of the third and fourth sub-pixel groups are greater than those of the second sub-pixel of the third and fourth sub-pixel groups, and the voltages of the third sub-pixel of the third and fourth sub-pixel groups are less than those of the second sub-pixel of the third and fourth sub-pixel groups.

22. The array substrate of claim 16, wherein the third sub-pixel of the third sub-pixel group and the first sub-pixel of the fourth sub-pixel group are disabled, and the first and second sub-pixels of the third sub-pixel group and the second and third sub-pixels of the fourth sub-pixel group are enabled in 3D display mode of the array substrate.

23. The array substrate of claim 15, wherein the switches of the first and third sub-pixels of the first sub-pixel group and the switch of the second sub-pixel of the second sub-pixel group are individually connected to one data line of the pair of the first data lines, but not connected to the other data line of the pair of first data lines.

24. The array substrate of claim 23, wherein the switch of the second sub-pixel of the first sub-pixel group and the switches of the first and third sub-pixels of the second sub-pixel group are individually connected to the other data line of the pair of first data lines, but not connected to the one data line of the pair of first data lines.

25. The array substrate of claim 15, wherein the first sub-pixel, the second sub-pixel, and the third sub-pixel of the first sub-pixel group are arranged sequentially in a predetermined direction and the first sub-pixel, the second sub-pixel, and the third sub-pixel of the second sub-pixel group arrange sequentially in the predetermined direction.

26. The array substrate of claim 25, wherein the predetermined direction is from top to bottom or from bottom to top.

27. The array substrate of claim 15, wherein the voltages of the first sub-pixel of the first and second sub-pixel groups are greater than those of the second sub-pixel of the first and second sub-pixel groups, and the voltages of the third sub-pixel of the first and second sub-pixel groups are less than those of the second sub-pixel of the first and second sub-pixel groups.

28. A driving method of an array substrate of a display panel, the method comprising:
providing an array substrate comprising:
a plurality of sub-pixel groups, comprising at least a first sub-pixel group and a second sub-pixel group, each of the sub-pixel groups comprising at least a first, second and third sub-pixel, and being disposed in a first column;
a plurality of switches individually disposed in the first, second, third sub-pixel of the first, second sub-pixel group;
a pair of first data lines disposed in at least one side of the first, second sub-pixel group, wherein the switches of the first, third sub-pixel of the first sub-pixel group and the switch of the second sub-pixel of the second sub-pixel group are connected to one of the pair of first data lines, and the switch of the second sub-pixel of first sub-pixel group and the switches of the first, third sub-pixel of the second sub-pixel group are connected to the other one of the pair of first data lines; and
a plurality of scan lines comprising at least a first, second and third scan lines crossed to the pair of first data lines, wherein the switches of the first and second sub-pixels of the first sub-pixel group are connected to the first scan line, the switch of the third sub-pixel of the first sub-pixel group and the switch of the first sub-pixel of the second sub-pixel group are connected to the second scan line, and the switches of the second and third sub-pixels of the second sub-pixel group are connected to the third scan line;
providing a plurality of voltages in a plurality of time sequences to the first data line wherein the plurality of time sequences comprises a first time sequence, a second time sequence, and a third time sequence, and the plurality of voltages comprise a first voltage, a second voltage, and a third voltage; and
charging the respective one of the first, second and third sub-pixel of the first and second sub-pixel groups by turning on the plurality of scan lines in each corresponding time sequence wherein the first and second sub-pixel of the first sub-pixel group are enabled in the first time sequence to let the first sub-pixel of the first sub-pixel group have the first voltage and the second sub-pixel of the first sub-pixel group have the second voltage, wherein the first voltage is greater than the second voltage, the third sub-pixel of the first sub-pixel group and the first sub-pixel of the second sub-pixel group are enabled in the second time sequence to let the third sub-pixel of the first sub-pixel group have the third voltage and the first sub-pixel of the second sub-pixel group have the first voltage, wherein the first voltage is greater than the third voltage, the second sub-pixel of the second sub-pixel group and the third sub-pixel of the second sub-pixel group are enabled in the third time sequence to let the second sub-pixel of the second sub-pixel group have the second voltage and the third sub-pixel of the second sub-pixel group have the third voltage, wherein the second voltage is greater than the third voltage.

29. The driving method of claim 28, wherein the voltage provided to one of the pair of first data lines is different from that to the other one of the pair of first data lines in any of the time sequences.

30. The driving method of claim 29, wherein the third voltage for the third sub-pixel of the first sub-pixel group, and the first voltage for the first sub-pixel of the second sub-pixel group are less than the enabling voltage of for the third sub-pixel of the first sub-pixel group and the first sub-pixel of the second sub-pixel group respectively.

31. A driving method of an array substrate of a display panel, the method comprising:
providing an array substrate comprising:
a plurality of sub-pixel groups, comprising at least a first sub-pixel group and a second sub-pixel group, each of the sub-pixel groups comprising at least a first, second and third sub-pixel, and being disposed in a first column, wherein the first sub-pixel, the second sub-pixel, and the third sub-pixel of the first sub-pixel croup are arranged sequentially in a predetermined direction from top to bottom and the first sub-pixel, the second sub-pixel, and the third sub-pixel of the second sub-pixel croup are arranged sequentially in the predetermined direction;
a plurality of switches individually disposed in the first, second, third sub-pixel of the first, second sub-pixel group;
a pair of first data lines disposed in at least one side of the first, second sub-pixel group, wherein the switches of the first, third sub-pixel of the first sub-pixel group and the switch of the second sub-pixel of the second sub-pixel group are connected to one of the pair of first data lines, and the switch of the second sub-pixel of first sub-pixel group and the switches of the first, third sub-pixel of the second sub-pixel group are connected to the other one of the pair of first data lines; and
a plurality of scan lines comprising at least a first, second and third scan lines crossed to the pair of first data lines, wherein the switches of the first and second sub-pixels of the first sub-pixel group are connected to the first scan line, the switch of the third sub-pixel of the first sub-pixel group and the switch of the first sub-pixel of the second sub-pixel group are connected to the second scan line, and the switches of the second and third sub-pixels of the second sub-pixel group are connected to the third scan line;

providing a plurality of voltages in a plurality of time sequences to the first data line wherein the plurality of time sequences comprises a first time sequence, a second time sequence, and a third time sequence, and the plurality of voltages comprise a first voltage, a second voltage, and a third voltage; and charging the respective one of the first, second and third sub-pixel of the first and second sub-pixel groups by turning on the plurality of scan lines in each corresponding time sequence wherein the third voltage for the third sub-pixel of the first sub-pixel group, and the first voltage for the first sub-pixel of the second sub-pixel group are less than the enabling voltage of for the third sub-pixel of the first sub-pixel group and the first sub-pixel of the second sub-pixel group respectively, wherein the second and third sub-pixel of the first sub-pixel group provide a display image of a first eye and the second and the third sub-pixel of the second sub-pixel group provide a display image of a second eye.

32. The driving method of claim 31, wherein the voltage provided to one of the pair of first data lines is different from that to the other one of the pair of first data lines in any of the time sequences.

* * * * *